(12) United States Patent
Katragadda et al.

(10) Patent No.: US 10,542,046 B2
(45) Date of Patent: Jan. 21, 2020

(54) SYSTEMS AND METHODS FOR BLOCKCHAIN SECURITY DATA INTELLIGENCE

(71) Applicant: Unifyvault LLC, Ann Arbor, MI (US)

(72) Inventors: Rakesh Babu Katragadda, Bloomfield Hills, MI (US); Juan Ramirez, Buenos Aires (AR); G. Krishna Kumar, Troy, MI (US); Chandana Karipineni, Northville, MI (US); Saritha Vellanki, Bloomfield Hills, MI (US); Sudha Kolachalam, Ashland, MA (US)

(73) Assignee: Unifyvault LLC, Ann Arbor, MI (US)

( * ) Notice: Subject to any disclaimer, the term of this patent is extended or adjusted under 35 U.S.C. 154(b) by 0 days.

(21) Appl. No.: 16/130,795

(22) Filed: Sep. 13, 2018

(65) Prior Publication Data

US 2019/0379699 A1    Dec. 12, 2019

Related U.S. Application Data

(60) Provisional application No. 62/681,993, filed on Jun. 7, 2018.

(51) Int. Cl.
*H04L 29/06*     (2006.01)
*G06N 5/04*      (2006.01)
(Continued)

(52) U.S. Cl.
CPC .......... *H04L 63/20* (2013.01); *G06F 21/6245* (2013.01); *G06N 5/043* (2013.01);
(Continued)

(58) Field of Classification Search
CPC . H04L 63/20; H04L 63/1425; H04L 63/1433; G06N 20/00; G06N 5/043
See application file for complete search history.

(56) References Cited

U.S. PATENT DOCUMENTS 10,009,358 B1 *   6/2018   Xie .................... G06F 21/316
2006/0191010 A1   8/2006   Benjamin
(Continued)

OTHER PUBLICATIONS

Konstantinos Christidis, et al., Blockchains and Smart Contracts for the Internet of Things, IEEE Access, Open Access Journal, Jun. 3, 2016, pp. 2292-2303, vol. 4, Raleigh, NC.
(Continued)

*Primary Examiner* — Ayoub Alata
(74) *Attorney, Agent, or Firm* — Dinsmore & Shohl LLP

(57) ABSTRACT

Embodiments are directed to systems and methods configured to gather, transmit, share and process security related data between end users and security applications/devices across multiple platforms using blockchain open implementation as the backend and smart contracts integrated with artificial intelligence and behavior analysis using rule engines to enforce/implement data decisions. The system is designed to continuously predict, monitor, prevent, detect, response and mitigate cyber threats. The process includes a self-enforced adaptable engine that has a fast incident response time and makes quick smart decisions. This is a resilient system that is constantly capturing data, learning, tracking and enforcing. Computational power is maximized by leveraging smart contracts to validate transactions between network devices, share encrypted and protected information about their functions, events across the network of nodes and make smart swarm decisions.

18 Claims, 13 Drawing Sheets

(51) Int. Cl.
*G06F 21/62* (2013.01)
*G06N 20/00* (2019.01)

(52) U.S. Cl.
CPC ......... *G06N 20/00* (2019.01); *H04L 63/1425* (2013.01); *H04L 63/1433* (2013.01); *H04L 63/1441* (2013.01); *H04L 63/302* (2013.01)

(56) References Cited

U.S. PATENT DOCUMENTS

| | | | |
|---|---|---|---|
| 2009/0228340 A1* | 9/2009 | Bohannon | G06Q 10/107 705/14.53 |
| 2012/0109821 A1* | 5/2012 | Barbour | G06Q 40/02 705/44 |
| 2013/0091539 A1 | 4/2013 | Khurana et al. | |
| 2014/0090061 A1* | 3/2014 | Avasarala | G06F 21/56 726/24 |
| 2014/0201836 A1 | 7/2014 | Amsler | |
| 2014/0223555 A1 | 8/2014 | Sanz Hernando et al. | |
| 2015/0026027 A1* | 1/2015 | Priess | G06Q 40/00 705/35 |
| 2015/0163242 A1 | 6/2015 | Laidlaw et al. | |
| 2016/0027229 A1* | 1/2016 | Spanos | G07C 13/00 705/51 |
| 2016/0342994 A1 | 11/2016 | Davis | |
| 2017/0034197 A1 | 2/2017 | Daniel et al. | |
| 2017/0177898 A1* | 6/2017 | Dillenberger | G06F 16/2379 |
| 2017/0279818 A1* | 9/2017 | Milazzo | H04L 63/1416 |
| 2017/0366353 A1 | 12/2017 | Struttmann | |

OTHER PUBLICATIONS

Florian Idelberger et al., Evaluation of Logic-Based Smart Contracts for Blockchain Systems, Conference Paper, Jun. 28, 2016, pp. 167-183, European University Institute, Fiesole, Italy, et al.

Michael Crosby et al., BlockChain Technology: Beyond Bitcoin, Applied Innovation Review Online Publication, Jun. 2016, pp. 1-16, Issue No. 2, UC Berkeley, CA.

Nassar M. Nasrabadi, Pattern Recognition and Machine Learning, Journal of Electronic Imaging Book Review, Oct.-Dec. 2007, vol. 16, Issue 4, U.S. Army Research Library, Adelphi, MD.

Konrad Rieck et al., Automatic Analysis of Malware Behavior using Machine Learning, Research Article, Journal of Computer Securtity, Jun. 20, 2011, pp. 639-668, vol. 19, No. 4, Berlin Institute of Technology, Berlin, Germany et al.

\* cited by examiner

SYSTEMS AND METHODS FOR BLOCKCHAIN SECURITY DATA INTELLIGENCE

CROSS-REFERENCE TO RELATED APPLICATIONS

This application claims the benefit of U.S. Provisional Application No. 62/681,993, filed Jun. 7, 2018, the contents of which are included herein by reference.

TECHNICAL FIELD

The present disclosure generally relates to security related data and, more particularly, to systems and methods for detecting and mitigating blockchain security gathering, transmitting, sharing and processing security related data between end users and devices across multiple platforms.

BACKGROUND

As background, the growth of the World Wide Web (internet) has caused a higher level of dependency on its various manifestations, such as the reliance on the globalization of services and commerce. However, the World Wide Web also has a growing risk of cybercrime. As such, because of the growing use of the World Wide Web combined with the availability of powerful computational systems at a lower price, cyber attackers have also drastically improved their ability to make lethal malware programs that adapt very rapidly using the concept of self-learning. These self-learning malware programs evade existing anti-virus detection technologies by utilizing code obfuscation techniques, which iteratively modify the malware and make it intelligent so each version appears different and undetectable by the traditional anti-virus programs.

As a result of the failure of traditional anti-virus programs, millions of dollars in losses for large corporations including the theft of intellectual property, financial theft, health data and personal identifiable information are among the most common losses. In response, artificial intelligence (AI), which also uses a concept of self-learning, has been used to detect the lethal malware programs. However, AI requires significant training and time to self-learn the detection of these malware programs and there is a high number of false positives which results in the malware detection ratio being very low. Blockchain is just as susceptible as the World Wide Web to these lethal malware programs.

Blockchain is used daily in the financial world for transactional data. As such, Blockchain is a transparent distributed technology that is immutable, auditable by the public and is generally known to be a highly trustworthy technology because every transaction record contain identifiers of previous transactions, which prevents the ability to compromise a data record with the concept of distributed data. However Blockchain alone cannot be used for detecting threats or malware in the cybersecurity landscape Accordingly, a need exists for a system and method that combines the immutable electronic method with artificial intelligence and the use of behavior analysis to detect and deter cyber threats in the blockchain environment.

SUMMARY

In one embodiment, a method for detecting vulnerabilities and anomalies in a computational environment is provided. The method includes receiving, from a client environment, at least one input data distributed among a plurality of nodes within a particular network. A curator engine receives, from at least one of the plurality of nodes, the at least one input data into. A transaction engine receives, from the curator engine, the at least one input data into a transaction engine. The at least one input data is evaluated for information and events or vectors of attack, where the information and events or vectors of attack as an indicator are ranked, the indicator or vector of attack are logged into the network, the indicator or vectors of attack are validated, and the indicator or vectors of attack are recorded into a blockchain database as a transaction having generated at least a first transaction identification. A rule engine processes the transaction so to make a decision to transform or analyze the transaction based on a predetermined set of rules. An action engine processes the transaction from the rule engine, wherein the action engine decides and generates feedback to the client environment.

In another embodiment, a method of detecting malware vulnerabilities in a computational environment is provided. The method includes receiving, from a client environment or a system log, at least one input data distributed among a plurality of nodes within a particular network. The at least one input data is received from at least one of the plurality of nodes, into a curator engine to convert the at least one input data into a token. The token is received, from the curator engine, into a transaction engine. The token is stored into a blockchain database and processed, by a rule engine, so to make a decision to transform or analyze the transaction based on a predetermined set of rules. The token is converted, by the curator engine, the token into a data file, where the data file is evaluated by an external malware analysis engine. The data file is aggregated, by a data aggregator, for a plurality of behavior models. The data file is converted, by the curator engine, into the token, wherein the token is determined whether to be malware, by the rule engine, and assigned a second transaction and stored the determination prior to an action engine rejecting the token or permitting the token into the client environment.

In yet another embodiment, a method of detecting vulnerabilities and anomalies in a computational environment is provided. The method includes registering, by a unique identifier, an internet of things device to a transaction engine such that a unique signature is provided. The transaction engine determines a plurality of data to be collected from the internet of things device. A blockchain database records the unique signature. A rule engine validates the unique signature so to make a decision regarding a plurality of firmware and a plurality of machine code associated with the internet of things device based on a predetermined set of rules. An action engine processes the transaction from the rule engine and alerts feedback to a client environment, wherein. the plurality of firmware and machine code in the internet of things device is analyzed so to maintain enabled capabilities, shielding, and enforcing continuous working order.

In still yet another embodiment, a system of enforcing privacy policy regulations in a computational environment is provided. The system includes a client user interface, a client environment, and a swarm intelligence. The client environment has a plurality of first databases, a plurality of client applications, a curator engine, and an action engine. The plurality of client applications includes a new user register and a new user event. The plurality of client applications is communicatively coupled to the plurality of first databases. The curator engine is communicatively coupled to both the client environment and the plurality of first databases. The swarm intelligence has a transaction engine, a blockchain database, and a rule engine. The swarm intelligence is communicatively coupled to the client environment. The transaction engine is communicatively coupled to the curator engine and to the blockchain database. The blockchain database is communicatively coupled to the rule engine. The rule engine is communicatively coupled to the action engine. The action engine is communicatively coupled to the client user interface. The system is configured to execute and enforce a plurality of data traceability from an integrated system across a browser, a session, a webserver, or a plurality of second databases configured with a personal identifiable information by indexing the personal identifiable information from a genesis block such that a user is permitted to log, delete or encrypt the personal identifiable information according with current and future policy laws.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to systems and methods for detecting vulnerabilities and anomalies in a computational environment. The method uses self-learning intelligent systems with the ability to detect, defend and alert threats or illegitimate behavior in the computational environment. As such, the system is configured to continuously learn from various data sources, such as security researchers in which a swarm intelligence may be used either alone or in conjunction with machine learning and behavior analysis. Further, the system is configured to utilize blockchain distributed database to achieve transparency of all the transactions. The system is further configured to use advanced adaptation and distribution of intelligence making each node or endpoint extremely intelligent and fast to proactively act on various threats.

As such, embodiments of the present disclosure are configured to use blockchain technology combined with machine learning and behavior analysis with swarm intelligence to maximize computational power by leveraging smart decision making contracts that validate transactions between network devices, shares encrypted and protected information about their functions, events across the network of clients and make smart swarm decisions. In some embodiments, the system also enables full auditing and control of the deployed network and devices. The system is also constantly learning and accumulating new data creating a repository that keeps growing.

Figure 1:
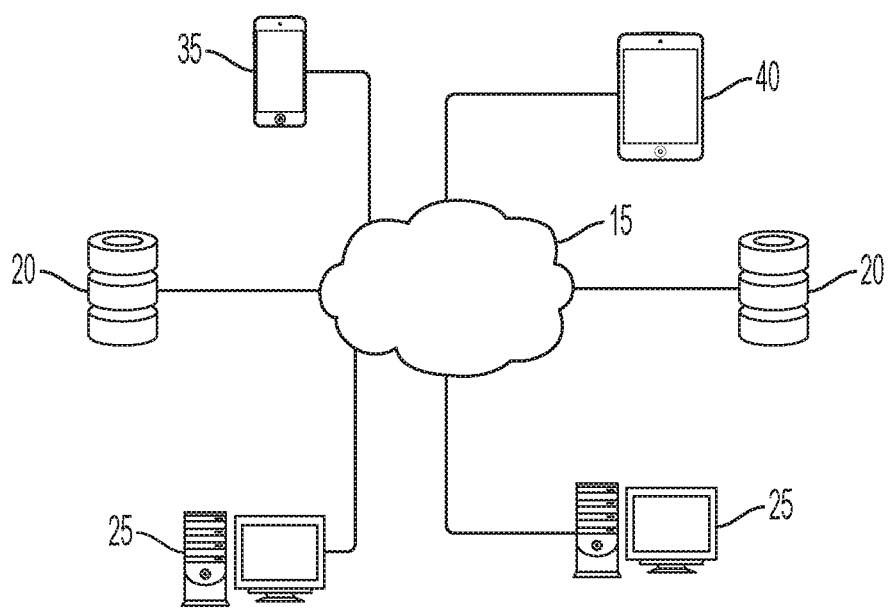
FIG. 1 schematically depicts a plurality of illustrative networked devices that may be used to provide a system of swarm intelligence for detecting and deterring malware threats in a Blockchain environment according to one or more embodiments shown or described herein.

Whenever possible, the same reference numerals will be used throughout the drawings to refer to the same or like parts. One embodiment of a system for detecting vulnerabilities and anomalies in a computational environment is depicted in FIG. 1, in which the system includes one or more server computing devices, one or more user computing devices, and/or one or more mobile devices that are particularly interconnected to provide the capability described herein. The system in FIG. 1 provides a particularly configured platform that utilizes a blockchain construct to manage connections between members of a swarm, and/or a plurality of nodes, particularly with respect to connecting security researchers from all over the globe so to validate information and events or vectors of attack. The indicators or vectors of attack are recorded into a blockchain database so to be distributed throughout the swarm and/or the plurality of nodes to protect those connected from unwanted intrusions, malware, vulnerabilities, and/or the like.

The phrase "communicatively coupled" is used herein to describe the interconnectivity of various components of the system for detecting vulnerabilities and anomalies in a computational environment and means that the components are connected either through wires, optical fibers, or wirelessly such that electrical, optical, and/or electromagnetic signals may be exchanged between the components. It should be understood that other means of connecting the various components of the system not specifically described herein are included without departing from the scope of the present disclosure.

The phrase "agent" as used herein generally refers to a piece of software, a processing unit programmed to perform one or multiple tasks. an agent can take on any role. For example, an agent may act as a rule engine, a transaction engine, a curator, and/or the like.

The phrase "alert" as used herein generally refers to notifications about an event that has occurred or may potentially occur in a computer environment.

The phrase "blockchain" as used herein generally refers to a digitized, decentralized, public ledger of all transactions. Each node (a computer connected to the network) gets a copy of the blockchain, which is downloaded automatically.

The phrase "blockchain database" as used herein generally refers to a decentralized, distributed database that uses blockchain technology. Control is decentralized. Transactions are transparent across to all users and are processed by a network of users so that everyone is creating the same shared system of record simultaneously.

The phrase "curator" as used herein generally refers to processes and transforms the information to a structure readable by other components.

The phrase "curator engine" as used herein generally refers to curating information that is gathered by node clients.

The phrase "dynamic hash table" (DHT) as used herein generally refers to a data structure which implements an associative array abstract data type, a structure that can map keys to values. A hash table uses a hash function to compute an index into an array of buckets or slots, from which the desired value can be found, (key, value) pairs are stored in a DHT, and any participating node can efficiently retrieve the value associated with a given key.

The phrase "vulnerability" as used herein generally refers to usually a flaw or a weakness in a computer software application that can be exploited by an outside threat actor to perform unauthorized actions in a computer based environment.

The phrase "enterprise resource planning" (ERP) as used herein generally refers to the integrated management of core business processes, by software and technology. ERP is usually a suite of integrated applications with several modules. Each module is a category of business-management software. The software modules include but not limited to human resources, supply chain management, customer relationship management, and/or the like. Commercially available systems may include Microsoft Dynamics. SAP, Oracle, and/or the like.

The phrase "event module" as used herein generally refers to creating events and processes different types of actions. Anything that requires action is sent to the event module which will define the action and routes the information accordingly. Event module may be group of nodes or agents.

The phrase "hive" as used herein generally refers to a collection of swarms. Each hive can hold multiple roles and or functions depending on their role setup at its genesis. The deployed hive can only be accessed by a set of permissioned keys, keys that are enforced by Blockchain smart contracts.

The phrase "information and events" (IAE) as used herein generally refers to an indicators of activity (IOA), an indicator of events (IOE), an indicators of comprise (IOC), or an indicators of usage (IOU).

The phrase "Internet of Things" (IoT) as used herein generally refers to the ever-growing network of physical objects that feature an IP address for internet connectivity, and the communication that occurs between these objects and other Internet-enabled devices and systems. These physical objects include sensor devices that take in environmental readings like temperature, pressure, volume, and/or the like with an embedded firmware and relaying that information over wired or wireless communication channels to a graphical user interface (GUI) on an end user application or device.

The phrase "application program interface" (API) as used herein generally refers to a software intermediary that allows two diverse software applications to communicate between each other so that the output of one application can be fed as an input to the next application creating a more unified system in software. API can also be used for the firmware written in an embedded systems program of Internet of Things (IoT) to communicate with a user dashboard or another software application for example so that the related hardware sensor from the IoT devices is interpreted by a User interface software.

The phrase "malware" as used herein generally refers to malicious software written deliberately and is intended to damage or disable computers, servers, computer networks and computer systems to cause harm or steal information from the target computer system. This form of software includes but not limited to executable code, active content, scripts, and/or the like. Further, this form of software may be a file or file less.

The phrase "ransomware" as used herein generally refers to a form of malware that encrypts targeted computer systems and locks down the system until a reward or another form of monetary payment is made. The intended user is usually tricked into downloading a file that comes in an attachment on email application.

The phrase "machine learning" as used herein generally refers to an application of artificial intelligence (AI) that provides systems the ability to automatically learn and improve from experience without being explicitly programmed. Machine learning generally focuses on the development of computer programs that can access data and use it learn for themselves. The process of learning may begin with observations or data, such as, for example, direct experience or instruction, in order to look for patterns in data and make better decisions in the future based on the examples that are provided. The primary aim may be to allow the computers learn automatically without human intervention or assistance and adjust actions accordingly. Machine learning algorithms are often categorized as supervised or unsupervised. Supervised algorithms may apply what has been learned in the past to new data using labeled examples to predict future events. Starting from the analysis of a known training dataset, the learning algorithm may produce an inferred function to make predictions about the output values. The system may be able to provide targets for any new input after sufficient training. The learning algorithm can also compare its output with the correct, intended output and find errors in order to modify the model accordingly. In contrast, unsupervised algorithms may be used when the information used to train is neither classified nor labeled. Unsupervised learning generally studies how systems may infer a function to describe a hidden structure from unlabeled data. The system may not figure out the right output, but it explores the data and can draw inferences from datasets to describe hidden structures from unlabeled data. Reinforcement algorithm may be a learning method that interacts with its environment by producing actions and discovers errors or rewards. Trial and error search and delayed reward are the most relevant characteristics of reinforcement learning. This method may allow machines and software agents to automatically determine the ideal behavior within a specific context in order to maximize its performance. Simple reward feedback may be required for the agent to learn which action is best: this is known as the reinforcement signal.

The phrase "supervised machine learning" as used herein generally refers to learning is the optimization of a prediction model to best describe the mapping from the input data to its assigned target label, with the end goal of being able to predict the target label of unknown data. The optimizing of the model is alternatively referred to as model fitting or model training.

The phrase "unsupervised machine learning" as used herein generally refers to a type of machine learning algorithm used to draw inferences from datasets consisting of input data without labeled responses, used for exploratory data analysis to find hidden patterns or grouping in data.

The phrase "artificial intelligence" as used herein generally refers to a development of computer systems able to perform tasks normally requiring human intelligence.

The phrase "security incident and event management" (SIEM) as used herein generally refers to real-time analysis of security alerts generated by applications and network hardware.

The phrase "firewall" as used herein generally refers to a network security device that monitors traffic to or from your network. It allows or blocks traffic based on a defined set of security rules.

The phrase "intrusion detection system" as used herein generally refers to a system with the purpose of detect anomalies and report securities that may compromise host or networks.

The phrase "web gateway" as used herein generally refers to a node (router) in a computer network, a key stopping point for data on its way to or from other networks. It is a data communication device that provides a remote network with connectivity to a host network. Web gateway allows for user-initiated web/internet traffic to enter an internal network of an organization.

The phrase "email gateway" as used herein generally refers to a gateway for emails to enter an Organization's internal network The phrase "cybersecurity landscape" as used herein generally refers to a includes but not limited to threat intelligence, file & file less malware, zero day, ransomware, database threats, cloud security, IoT security, mobile security, and/or the like.

The phrase "metadata" as used herein generally refers to a unique data structure used to describe other data within the system.

The phrase "audit" as used herein generally refers to a comprehensive review of an organization's adherence to regulatory guidelines to evaluate the strength and thoroughness of compliance preparations.

The phrase "data storage" as used herein generally refers to a digital mechanism used to stored and hold distributed and process information between the nodes.

The phrase "social network" as used herein generally refers to a computer application or software that enables personal interaction between people by using messages, pictures or video and share among others to be able to communicate with each other.

The phrase "behavior analysis" as used herein generally refers to the use of a set of rules or algorithms to detect human behavior changes.

The phrase "client network" as used herein generally refers to the connected network of the client, where the client host computers reside.

The phrase "client host" as used herein generally refers to a single computer or system used and managed by the client, it resides within the boundaries of the client network The phrase "TOR network" as used herein generally refers to an open network believed to protect against normal internet surveillance or traffic analysis.

The phrase "dark web (I2P)" as used herein generally refers to a part of the world wide web that is accessible only by using specialized software and part of the Invisible Internet Project (I2P).

The phrase "knowledge database" as used herein generally refers to an incremental set and structured data stored, and immutable that holds user and system curated and normalized information in a ready state to be used and aggregated by the agents and system.

The phrase "node" as used herein generally refers to a notification node, action node, or processing node depending their predefined role. Each node acts as an independent processing unit that comprises of smart contracts and a blockchain knowledge database. Every end point of any computational device/environment is a node. These end points of any computational device may include, but are not limited to, mobile phone, client computers, virtual machines, and/or the like.

The phrase "rule" as used herein generally defines the course of action to be taken for a transaction or for another rule.

The phrase "rule database" as used herein generally refers to a blockchain database that stores and records all rules created.

The phrase "rule engine" as used herein generally refers to creating and/or recording new rules in the rules database and also validates against existing rules in rules database. Rule engine also includes supervised and unsupervised machine learning techniques and behavior analysis modules that provide decision making capabilities in near real time and to create alerts or notifications. It routes the traffic to network based on validation. It is in charge of message delivery system and can detect the type of connectivity.

The phrase "smart contract" as used herein generally refers to a piece of dynamic lines of code. It is a computer protocol intended to digitally facilitate, verify, or enforce the negotiation or performance of a contract. Smart contracts allow the performance of credible transactions without third parties. These transactions are trackable and irreversible. These contracts, live within the network and within each node with a unique address. Every subsequent version of the contract is stored and a new hash identification is created. With it a contract versioning system is enforced.

The phrase "swarm" as used herein generally refers to a collection of nodes. Each swarm can hold multiple roles and or functions depending on their role setup at its genesis. Swarms are platform independent and build upon the concept of resilient networks.

The phrase "swarm intelligence" as used herein generally refers to the study of computational systems inspired by the 'collective intelligence'. Collective intelligence emerges through the cooperation of large numbers of homogeneous nodes in the environment. Examples include schools of fish, flocks of birds, and colonies of ants. Such intelligence is decentralized, self-organizing and distributed throughout an environment. In nature, such systems are commonly used to solve problems such as effective foraging for food, prey evading, or colony re-location. The information is typically stored throughout the participating homogeneous agents, or is stored or communicated in the environment itself, such as through the use of pheromones in ants, dancing in bees, and proximity in fish and birds. Swarm Intelligence may be generally useful for IT in terms of following aspects: (i) Analogies in IT and social insects; (ii) Distributed system of interacting autonomous agents; (iii) Goals: performance optimization and robustness; (iv) Self-organized control and cooperation (decentralized); (v) Division of Labor and distributed task allocation; and (vi) Indirect interactions. The paradigm consists of two dominant sub-fields: (i) Ant colony optimization (ACO) that investigates probabilistic algorithms inspired by the stigmergy and foraging behavior of ants; and (ii) Particle swarm optimization (PSO) that investigates probabilistic algorithms inspired by the flocking, schooling and herding. Like evolutionary computation, swarm intelligence 'algorithms' or 'strategies' are considered adaptive strategies and are typically applied to search and optimization domains.

The phrase "security data intelligence system" (SDIS) as used herein generally can be implemented within a permissioned network, private or public available blockchain network.

The phrase "smart contract engine" as used herein generally refers to executing the smart contracts deployed across the network as needed.

The phrase "swarm application program interface" (API) as used herein generally refers to an integrator between the client and the swarm, allowing an easy interface between the user and the systems within.

The phrase "token" as used herein generally refers to a unique string sequence that identifies an object. It is calculated by applying a hashing function to the metadata, timestamp of creation of the token and, if available, a payload of the object.

The phrase "transaction" as used herein generally represents a unit of work performed within a database management system against a database. It is independent of other transactions and generally represents any change in a database.

The phrase "transaction database" as used herein generally refers to a blockchain database that stores and records all transactions created.

The phrase "transaction engine" as used herein generally creates and/or records new transactions in the transactions database and also validates against existing transactions in the same.

The phrase "vault" as used herein generally refers to a Vault 365.

The phrase "web dashboard user interface" as used herein generally refers to administer, configure and read node, swarm or hive information, is cross platform, and can be enabled at runtime. This is in the form of graphical user interface (GUI) that displays the IAE and other events. This end user environment can be used to configure alerts and other information according to the needs of the end customer.

The phrase "zero day" as used herein generally refers to an advanced cyber-attack, a previously unknown vulnerability.

The phrase "cryptocurrency" as used herein generally refers to a form of digital currency that are used to regulate generation of units of currency to verify transfer of funds through an encrypted channel.

The phrase "reward" as used herein generally refers to cryptocurrency issued to anonymous donors of zero day vulnerabilities. The reward incentivizes anonymous programmers to share information on vulnerabilities not known to the public and are used by hackers or criminal groups to exploit and attack computer systems by sending in malware, spyware, and/or the like.

The phrase "action engine" as used herein generally refers to being in charge of executing any kind of predefined actions and interacting with the client environment. The messages sent to client environment from action engine could be a trigger, an alerts, an alarms, a plurality of notifications, and/or the like.

The phrase "advanced persistent threats" (APT) as used herein generally refers to a set of stealthy and continuous computer hacking processes, often orchestrated by a person or persons targeting a specific entity. An APT usually targets either private organizations, states or both for business or political motives.

The phrase "firmware" as used herein generally refers to software that is embedded in a piece of hardware.

The phrase "sensors" as used herein generally refers to a device, module, or subsystem whose purpose is to detect events or changes in its environment and send the information to other electronics, frequently a computer processor.

The phrase "peripheral components" as used herein generally refers to any auxiliary components that helps or provides interaction to an IoT device.

The phrase "distributed denial of service" (DDoS) as used herein generally refers to an attack in which multiple compromised computer systems attack a target, such as a server, website or other network resource, and cause a denial of service for users of the targeted resource. The flood of incoming messages, connection requests or malformed packets to the target system forces it to slow down or even crash and shut down, thereby denying service to legitimate users or systems.

The phrase "Vault 365" as used herein generally refers to a client/user interface.

The phrase "Payload" as used herein generally refers to user specific data in a previously established format.

The phrase "Event" as used herein generally refers to a change in the everyday operations of a network or information technology service indicating that a security policy may have been violated or a security check may have failed. An event can be any identifiable occurrence that has significance for system hardware, software or data.

The phrase "Attribute" as used herein generally refers to a piece of information or value that determines the properties of a cyber security event. In this case, an attribute may be variations of payload depending on the target.

Further, it should be appreciated that the following glossary of messages are incorporated herein:

M1—client environment 105 to curator engine 106 having the following structure: System-ID (String), System-Name (String), Date (Time String), Owner (String), Path (String), Data (Byte).

M101—curator engine to transaction engine, transaction engine to the blockchain database, the transaction engine to the rule engine, all having the following structure: TxID, TIMESTAMP, HASH, PREV-HASH, METADATA—M801 Digest, DATA—M1 Content.

M104—the rule engine to the action engine having the following structure: TXID, TIMESTAMP, HASH, PREV-HASH, METADATA, Decision Index, Decision Confidence.

M2—the rule engine to the blockchain database having the following structure: TxID, TIMESTAMP, HASH, PREV-HASH, METADATA, DATA, INDEX, CONFIDENCE, TYPE, Payload.

M10—the action engine to the client environment, action engine to SIEM, EMAIL, SMS, notifications and alerts, OS System Log, Rsyslog server, and/or the like all having the following structure: TxID, System Origin, System Destination, Action, Reason, Payload Data.

M809—the swarm intelligence 121 to the rule engine 108; reinforced learning and knowledge distribution between all the nodes in the network having the following structure: TxID, Timestamp, hash, prey-hash, metadata, index, data, shown as data shared between components.

M106—Between nodes data blocks (like rows in a database) all having the following structure: TxID, TIMESTAMP, HASH, PREV-HASH, METADATA, DATA, INDEX, CONFIDENCE, TYPE, Payload.

M701—curator engine to transaction engine, transaction engine to the blockchain database, the transaction engine to the rule engine, all having the following structure: TxID, TIMESTAMP, HASH, PREV-HASH, METADATA—M801 Digest, DATA—M1 Content.

M702—Json struct, threat_id string, Threat TYPE stringm files [ ]string, urls [ ]string.

M703—Json Structm cartegorym file, machine: null, errors: [ ], target: /tmp/malware. Exe, package: null, sample_id: 1, guest ( ), custom: null, owner: priorty: 1, platform: null, options: null, status: pending, enforce_timeout: false timeout: 0, memory: false, tags: 32 bit, acrobat_6.

M801—register new device to transaction engine 107 having the following structure: DeviceID, GPS coordinates, ROM ID, OS VERSION ID, Device name, date (time), data.

M802—event to transaction engine 107 having the following structure: DeviceID, ROM ID, OS VERSION ID, Device-name, date (time), data, eventID, eventType.

With reference now to FIG. 1, a decentralized platform for connecting members of the swarm intelligence community using a ledger system stored on a plurality of nodes, which is also referred to herein as a computer system, is illustrated in FIG. 1. The computer system, generally designated 10, includes, but is not limited to, a computer network 15 that is generally configured to electronically connect one or more server computing devices 20, one or more user computing devices 25, and/or one or more personal electronic devices 30 (e.g., one or more tablet computing devices 35 and/or one or more mobile devices 40).

The computer network 15 may include any network now known or later developed, including, but not limited to, a wide area network (WAN), such as the Internet, a local area network (LAN), a mobile communications network, a public service telephone network (PSTN), a personal area network (PAN), a metropolitan area network (MAN), a virtual private network (VPN), or any combination thereof.

The one or more server computing devices 20 may receive electronic data and/or the like from one or more sources (e.g., the one or more user computing devices 25), create an initial genesis block in a decentralized ledger, map a decentralized ledger to one or more authentication tokens, mapping references in a decentralized ledger to documents, storing files referenced in decentralized ledgers, storing metadata relating to the files referenced in decentralized ledgers, communicating with one or more databases, and/or the like. In some embodiments, the one or more server computing devices 20 may function as blockchain management devices. Accordingly, in some embodiments, the one or more server computing devices 20 may control a right or an ability to enter an additional block in the blockchain, as described in greater detail herein.

The decentralized ledger may be transmitted over the computer network 15 to other nodes, including, but not limited to other ones of the one or more server computing devices 20, the one or more user computing devices 25, and/or the one or more personal electronic devices 30. In some embodiments, the computer system 10 is decentralized in a manner such that entire copies of a ledger are stored on multiple nodes. In some embodiments, the ledger may be split up such that portions thereof are stored on different nodes and no single node contains the entire ledger.

The one or more user computing devices 25 may generally provide an interface between a user and the other components connected to the computer network 15, including other users and/or other user computing devices. Thus, the user computing device 25 may be used to perform one or more user-facing functions, such as receiving one or more inputs from a user or providing information to the user. Additionally, in the event that the one or more server computing devices 20 require oversight, updating, or correction, the one or more user computing devices 25 may be configured to provide the desired oversight, updating, and/or correction. The one or more user computing devices 25 may also be used to input additional data into a data storage portion of the one or more server computer devices 20. The one or more user computing devices 25 may also be used as nodes for the purposes of storing and/or updating at least a portion of a blockchain ledger, as described in greater detail herein.

The one or more personal electronic devices 30, including the one or more tablet computing devices 35 and/or the one or more mobile devices 40 are generally electronic devices that provide an interface between a user and the other components connected to the computer network 15, similar to the one or more user computing devices 25. Thus the one or more personal electronic devices 30 may be used to perform one or more user-facing functions, such as receiving one or more user inputs, alerts, notifications that provide information to a user, and/or the like. The one or more personal electronic devices 30 may also be used to input data into a data storage portion of the one or more server computer devices 20. The one or more personal electronic devices 30 may also be used as nodes for the purposes of storing and/or updating at least a portion of a blockchain ledger, as described in greater detail herein.

It should be understood that while the one or more user computing devices 25 are depicted as personal computers, the server computing devices 20 are depicted as servers, and the one or more personal electronic devices 30 are depicted as tablet computing devices 35 and/or mobile devices 40, these are nonlimiting examples. More specifically, in some embodiments, any type of computing device (e.g., mobile device, tablet computing device, personal computer, server, etc.) may be used for any of these components. Additionally, while each of these computing devices is illustrated in FIG. 1 as a single piece of hardware, this is also merely an example. More specifically, each of the one or more user computing devices 25, the one or more server computing devices 20, and the one or more personal electronic devices 35, 40 may represent a plurality of computers, servers, databases, components, and/or the like.

Figure 2:
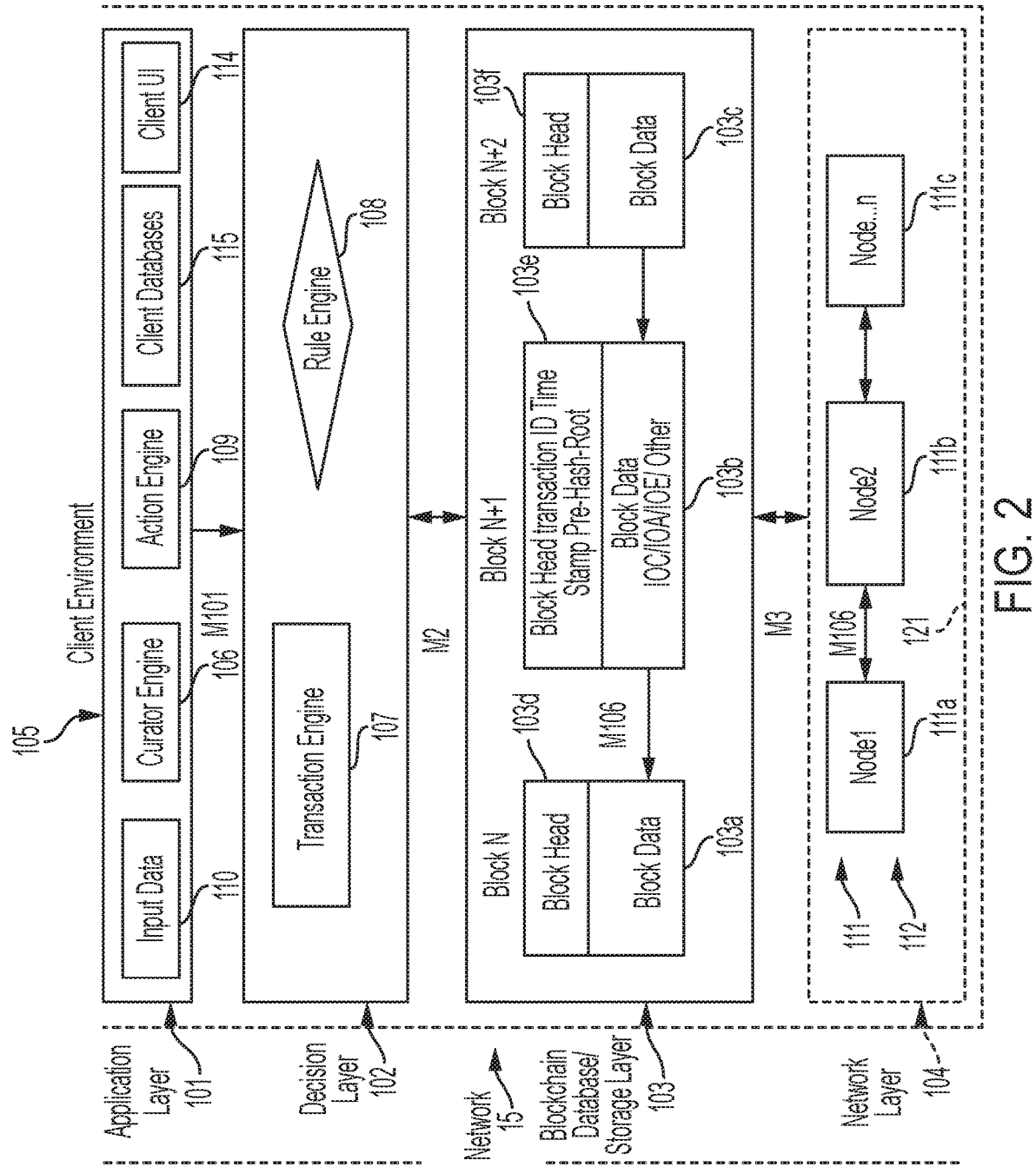
FIG. 2 schematically depicts an overview diagram of a system having a swarm intelligence for detecting and deterring malware threats in a blockchain environment according to one or more embodiments shown and described herein.

FIG. 2 schematically depicts an overview diagram of a system 100 of the network 15 having a swarm intelligence 121 for detecting and deterring malware threats in a blockchain environment. The system 100 generally includes four layers: an application layer 101, a decision layer 102, a storage layer 103 and a network layer 104.

As an overview, the application layer 101 is communicatively coupled to the decision layer 102, the decision layer 102 is communicatively coupled to both the storage layer 103 and the application layer 101. The storage layer 103 is also communicatively coupled to the network layer 104. The application layer 101 comprises a plurality of input data 110, an action engine 109, a client user interface (UI) 114, and a plurality of client databases 115, as discussed in greater detail herein. As used herein, the term "application layer 101" may be synonymous or interchangeable with the term "client environment 105" such that a client environment 105 includes the plurality of input data 110, the action engine 109, the client user interface (UI) 114, and the plurality of client databases 115, as discussed in greater detail herein. The decision layer 102 includes a transaction engine 107 and a rule engine 108, as discussed in greater detail herein. The storage layer 103 is a blockchain database 103 having a plurality of blocks data 103a, 103b, 103c, each block having a header 103d, 103e, 103f respectively. It should be appreciated that the headers 103d, 103e, 103f are a type of block address. It should also be appreciated that the plurality of blocks data 103a, 103b, 103c, and the corresponding headers 103d, 103e, 103f are dynamic and as the blockchain database 103 stores more data, more blocks with headers are added. Further, it should be appreciated that the terms "storage layer 103" and "blockchain database 103" are used interchangeably and thus generally may refer to the same structure. The network layer 104 comprises a group of nodes 111, illustrated as a client reporter node 111a, a second node 111b, and an infinite number of nodes 111c that together are in communication with one another so to for a swarm 112, as discussed in greater detail herein. Further, the network layer 104 connects the swarm 112 to the other layers (i.e. the application layer 101, the decision layer 102, and/or the storage layer 103) so to form a swarm intelligence 121.

The application layer 101 may generally be where a client interacts with the system 100 through a client environment 105. It should be appreciated that the client environment 105 is not limited to the devices in FIG. 1 such as desktops, servers, tablets, phones, sensors such as internet of things and/or the like. As such, input data 110 that enters the system 100 may be, for example, data from the client environment 105 that may include a system logs data 202 (FIG. 3), a malware data 204 (FIG. 3), a IoT data 206 (FIG. 3), a SIEM data 208 (FIG. 3) and/or the like. Further, because the client environment is not limited to desktops, servers, tablets, phones, sensors such as Internet of things and/or the like, the input data 110 to the client environment 105 is not limited to text files, text messages, video files, image files, and/or the like.

Input data 110 that enters the system 100 is curated by the curator engine 106 and then passed to the decision layer 102. A decision is made in the decision layer 102 and the decision is returned to the client environment 105. The action engine 109 acts on the decision and may send a signal, an alert, an alarm, a notification, and/or the like to the client UI 114. The client UI 114 may display the results such as the alerts, the notifications, and/or the like about a particular attack or detection of malware, and/or the like on a user interface dashboard, which may be included in the client environment 105. It should be appreciated that the client environment 105 may also be an endpoint system including, but not limited to, the server computing devices 20 (FIG. 1), the user computing devices 25 (FIG. 1), and the personal electronic devices 30 (FIG. 1)

The decision layer 102 may be where the data is processed and decisions are made based on content, rule setting and interactions with the client environment 105. As such, it should be appreciated that the decision layer 102 is configured to use artificial intelligence (AI), behavior analysis, other rule engines, and/or the like that will determine the result of a particular action being performed in the system 100.

The blockchain database 103 may be generally known as being extremely distributed, easy accessible, permission based, ordered and secure. The blockchain database 103 may be configured as long term memory for the decision layer 102. As such, all rules and transactions are recorded into the blockchain database 103. Every block 103a, 103b, 103c and respective header 103d, 103e, 103f contains the pertinent smart contract triggers that helps to identify the type of data, the direction of the data and the triggers to execute within it.

The network layer 104 is configured to interconnect the different components (i.e. the server computing device 20, the user computing device 25, the personal electronic device 30, and/or the like), and is responsible for sharing the data between peers. It should be appreciated that each node of the group of nodes 111 may be the server computing device 20 (FIG. 1), the user computing device 25 (FIG. 1), the personal electronic device 30 (FIG. 1), and/or the like. It should be appreciated that each node within the group of nodes 111 commutatively coupled, such as those in FIG. 1, are hereinafter referred to as a swarm 112.

As such, it should be appreciated that data coming from the client environment 105 is distributed among each node within the group of nodes 111. Each individual node, such as the client reporter node 111a, the second node 111b, and nodes 111c may generally consists of smart contract 305 (FIG. 4) and a copy of the blockchain database 103. It should be appreciated that each node of the group of nodes 111 are platform independent and multilanguage, not enforced as long that can communicate using TCP/IP and UDP/IP stack. Further, each node of the group of nodes have the capacity and capability to react to multiple actions at the same time, included but not limited to a notification of an events via e-mail, SMS, Syslog, UDP connection, TCP connection, Web Notification, JSON message, and/or the like. Further, administration events, such as firewall configuration, IDS rule writing, shutdown and reconfiguration of devices is contemplated.

Figure 3:
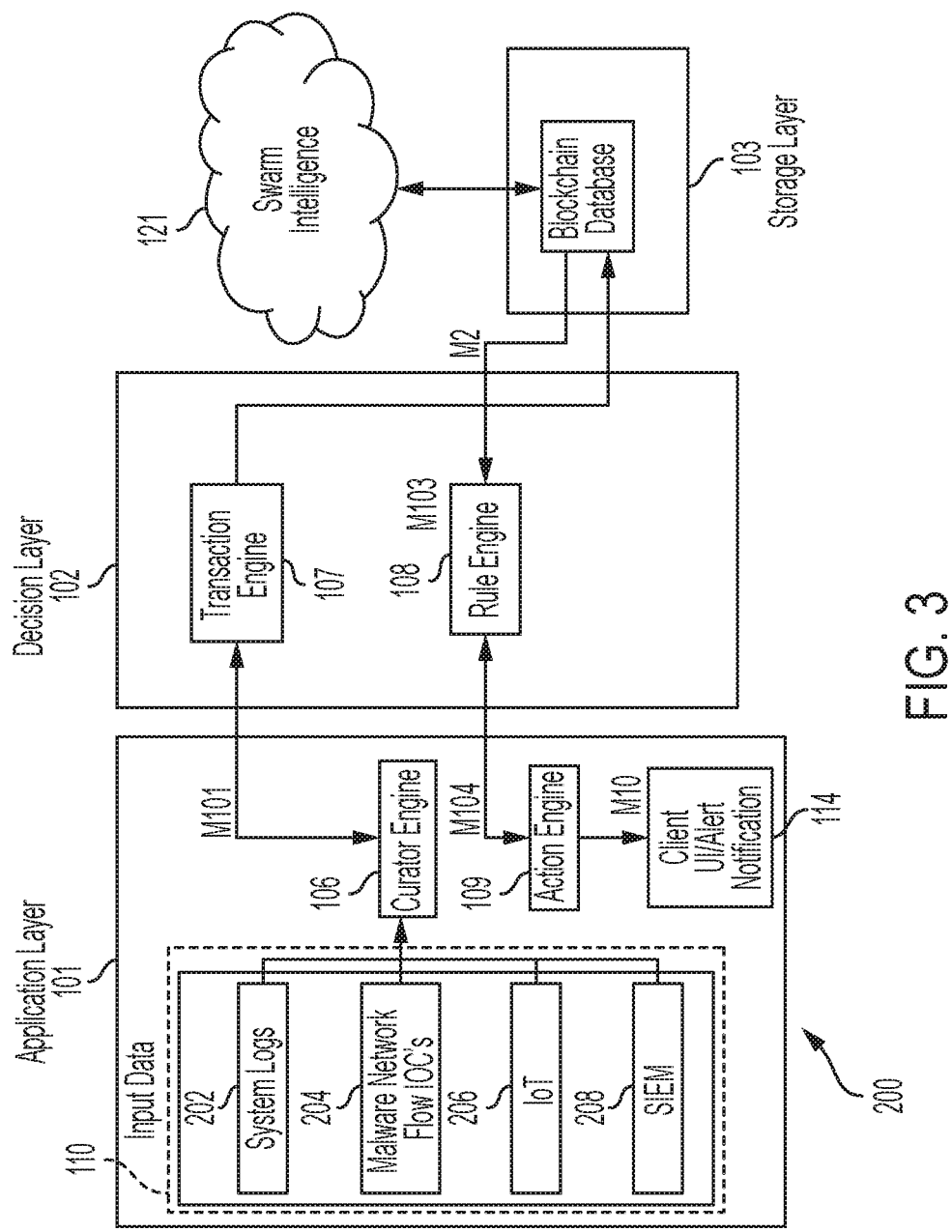
FIG. 3 schematically depicts a component diagram of the interaction of the overview diagram of FIG. 2 according to one or more embodiments shown and described herein.

FIG. 3 schematically depicts a component diagram of the interaction of the overview of the system 100 of FIG. 2. The input data 110 (i.e. the system logs data 202, the malware data 204, the rules database 205, the IoT data 206, the SIEM data 208) of the application layer 101 are communicatively coupled to the curator engine 106 of the application layer 101. The curator engine 106 may be configured to process and transform the input data 110 to a structure readable by other components, such as the transaction engine 107. For example, the curator engine 106 may be configured to transform the input data 110 into a valid message payload having a header M101.

Still referring to FIG. 3, the curator engine 106 is communicatively coupled to the transaction engine 107 of the decision layer 102. The blockchain database 103 is communicatively coupled to the transaction engine 107, to the swarm intelligence 121 and to a rule engine 108. As such every transaction is logged in the network layer 104 (FIG. 2) and recorded in the blockchain database 103 as transactions with a generated unique transaction identifier M103. It should be appreciated that the unique transaction identifier M103 may also contain other relevant data. Further, it should be appreciated that the rule engine 108 outputs a decision transaction M2 to the blockchain database 103 so that every decision and transaction is recorded within the blockchain database 103 such that all knowledge is shared and validated through the swarm intelligence 121 by all peer members, including a plurality of researchers.

The transaction engine 107 may also be responsible for evaluating the valid message payload having a header M101. For example, within the transaction engine 107, the valid message payload having a header M101 may be evaluated for IOC's, IOE's and/or vectors of attack as described in FIG. 13 below. As such, information and events (IAE) may be divided into indicators of compromise (IOC), indicators of attack (IOA), indicators of activity (IOV), and powered by indicators of usage (IOU). Each indicator may be ranked depending on the approval rating of researchers when evaluating possible vectors of attack. That is, if a vector has enough validation of approval from its peers or researchers, the indicator becomes a comprise vector and is logged in the network layer 104 (FIG. 2). As such, data is constantly analyzed in iterations. For example, something that is not a threat initially may become a threat vector in the next iteration. As such, the logging of the comprise vector orders the client reporter node 111a (FIG. 4) to execute the appropriate smart contract enabled transactions with the user define action. It should be appreciated that the client reporter node 111a (FIG. 4) may be any node of the group of nodes 111 and/or any node with the swarm 112 (FIG. 4) in which the transaction engine 107 is located or any other node communicatively coupled to the swarm intelligence 121. The vectors and indicators are validated, logged in the network layer 104 (FIG. 2), and recorded in the blockchain database 103, as discussed in greater detail herein.

Still referring to FIG. 3, the rule engine 108 may be configured to scan the blockchain database 103 and analyze the transaction M2 so to make a decision with regards to the transaction M2 such as whether to transform the transaction, analyze the transaction, save the transaction, and/or the like, based a predetermined set of rules. The predetermined set of rules may be stored in the blockchain database 103 and may be modified, amended, and/or the like by the swarm intelligence 121. The rule engine 108 outputs a decision signal M104 to the both the blockchain database 103 and an action engine 109, which is communicatively coupled to the rule engine 108. As such, all rule engine 108 decision signals M104 are recorded in the blockchain database 103 so to be shared to the swarm intelligence 121. The action engine 109 may be configured to execute the decision signal M104 as well as to make a decision on whether to generate a plurality of alerts M10 to the client environment 105 and specifically to the client UI 114.

Figure 4:
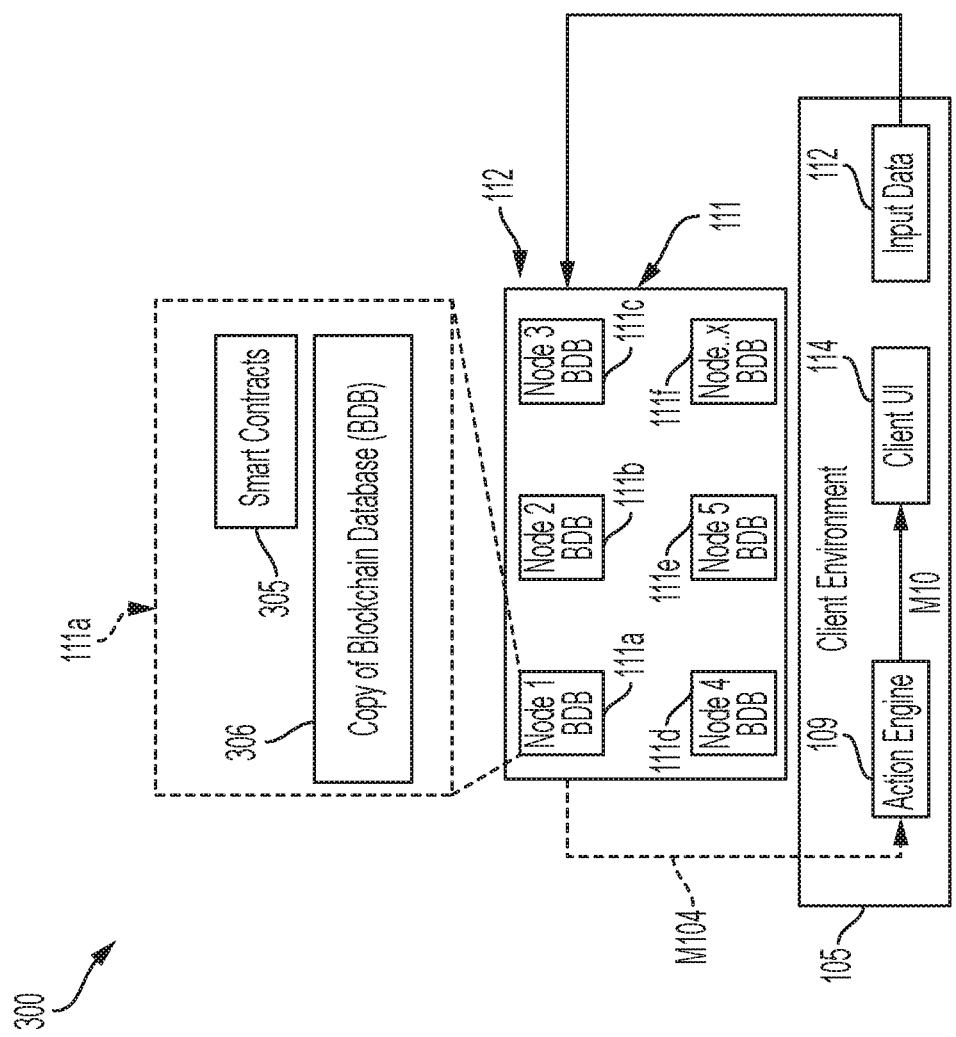
FIG. 4 schematically depicts a component diagram of the swarm intelligence of FIG. 2 according to one or more embodiments shown and described herein.

Now referring to FIG. 4, a component diagram 300 of the swarm intelligence 121 of FIG. 2 is depicted. The swarm 112 is configured to share information, ordered and securely between the group of nodes 111. Each node, illustrated, without limitation, as the client reporter node 111a further includes a representation of the blockchain database 103 communicatively coupled to a smart contract 305.

The client reporter node 111a processes the data, as described herein, and the node is communicatively coupled to the client environment 105 as described herein. As such, the node may input the input data 110 from the client environment 105 and output the decision signal M104 to the action engine 109 of the client environment 105, as described in greater detail above.

Still referring to FIG. 4, it should be appreciated that while the client reporter node 111a is described as the only node in the swarm 112 communicatively coupled to the client environment 105 of the application layer 101, any of the group of nodes 111 and/or of the swarm 112 may be communicatively coupled to the client environment 105 and/or to the swarm 112. As such, the swarm 112 may include only the client reporter node 111a communicatively coupled to the client environment 105 or more than the client reporter nodes may be communicatively coupled to the client environment 105. Therefore, every node does not have to be communicatively coupled to the input data 110 such that the other nodes may be configured to also perform other roles or swarm functions such as a processing, storage, routing, relaying, and/or the like.

That is, each of the nodes will have its own individual behavior and will perform in a way it will benefit the entire group. This is similar to nature inspired ants, bees, and/or the like that behave individually, but with a collective mentality. The group of nodes 111 may be distributed across the network layer 104 (FIG. 2). As such, each node within the swarm 112 may be a permissioned node and may be excluded from the swarm 112 at any time. The network layer 104, in case of compromise of the node, may isolate or shutdown the node and its controlled mechanism to avoid further damage or compromise. Further, the swarm 112 may contain, without limitation, an infinite number of nodes, such as the group of nodes 111 illustrated as including the client reporter node 111a, the second node 111b, and nodes 111c, 111d, 111e, and 111f.

Figure 5:
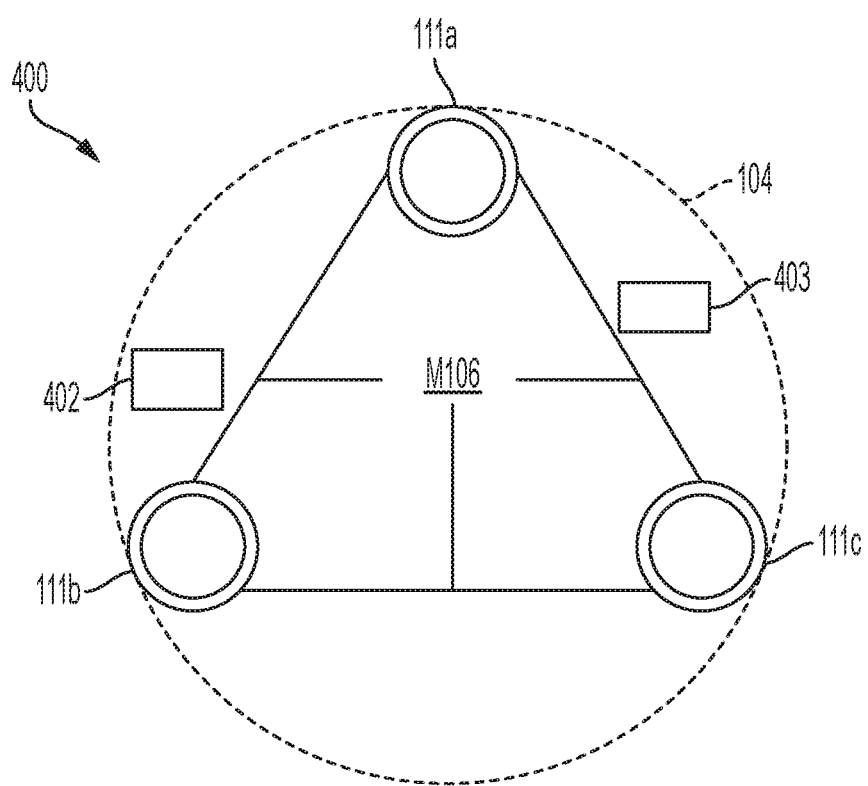
FIG. 5 schematically depicts a component diagram of a plurality of nodes of FIG. 2 according to one or more embodiments shown and described herein.

FIG. 5 schematically depicts a component diagram of an interaction between the client reporter node 111a, the second node 111b, and the nodes 111c of the swarm 112 of FIG. 4. The client reporter node 111a, the second node 111b, and nodes 111c are communicatively coupled to one another via the network layer 104. As shown, the client reporter node 111a, the second node 111b, and nodes 111c are in communication with a message exchange 402, such as communication M106 between nodes data blocks 103a, 103b, 103c and the smart contract 305 (FIG. 4) that may enforce the logic and rules. Further, each node of the group of nodes 111 is in communication with the blockchain database 103 (FIG. 3). Communication between the client reporter node 111a, the second node 111b, and nodes 111c is in the form of data blocks M106, in which each data block has the required structure to carry, transmit, and/or the like the message between the client reporter node 111a, the second node 111b, and nodes 111c and between the smart contract 305, the message exchange 402, the blockchain database 103 (FIG. 3), and/or the network layer 104.

Figure 6:
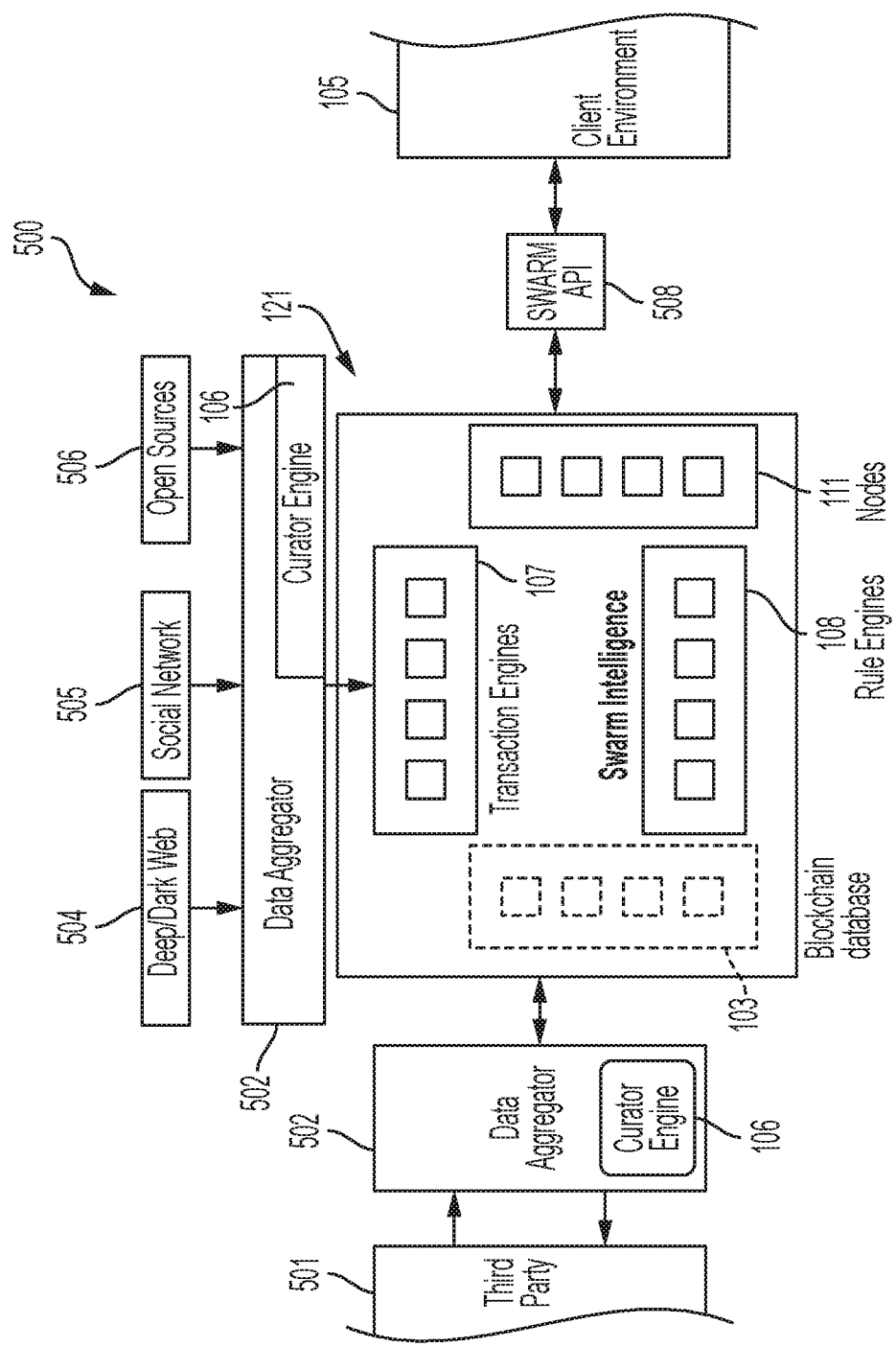
FIG. 6 schematically depicts a component diagram of swarm deployment according to one or more embodiments shown and described herein.

FIG. 6 schematically depicts a component diagram of a swarm deployment 500. A third party data 501, a dark web data 504, a social network data 505 and an open sources data 506 are communicatively coupled to a data aggregator 502. The data aggregator 502 may also contain or communicatively couple to the curator engine 106. The data aggregator 502 is communicatively coupled to the swarm intelligence 121. As discussed above, the swarm intelligence 121 is communicatively coupled to the group of nodes 111, the transaction engines 107, the rule engines 108, and/or the blockchain database 103. The swarm intelligence 121 is communicatively coupled the client environment by a swarm API 508. Regardless of the data source (i.e. the third party data 501, the dark web data 504, the social network data 505, and/or the open sources data 506) the swarm deployment 500 ensures that the data is aggregated, curated, and transferred to the swarm intelligence 121 for analysis. The analysis in the swarm intelligence 121 may be subject to unsupervised or supervised machine learning. The data and/or the machine learning, whether supervised or unsupervised, may be stored in the blockchain database 103. Further, it should be appreciated that machine learning, whether supervised or unsupervised, may occur in the swarm intelligence 121 and the result be transferred to the client environment via the swarm API 508.

For example, in some embodiments, the dark web data 504 or deep web data may be fed into the data aggregator 502 where curator engine 106 will process the data in a way can be used as input to the group of nodes 111 within the swarm intelligence 121. Example dark web data may be "dark nets" including TOR and Invisible Internet Project (I2P), which both generally serve as an attractive source for cyber criminals to host stolen credit card data, newest forms of malware, zero day exploits, stolen social security numbers, and/or the like. The group of nodes 111 within the swarm intelligence 121 may be configured to scan the deep or dark web data 504 so to gather information to protect and predict an attack along with being able to be used to scan for stolen information or gather intelligence on zero day vulnerabilities. As such, as discussed in greater detail above, the alert M10 may be generated from the data gathered and/or authenticated by the swarm intelligence 121, passed though the swarm API 508, to the client environment 105 so to provide alerts, notifications, and/or the like to the client environment 105 via the client UI 114.

It should be appreciated that the open sources data 506 and the third party data 501 may be predetermined as to which ones and/or the data searched based on agreements in place dictating which open source data (i.e. common vulnerabilities and exposures (CVE), national vulnerability database (NVD), and/or the like) are scanned. As such, the third party data 501 and the open sources data 506 may require specific connectors to communicatively couple the data source to the data aggregator 502.

Figure 7:
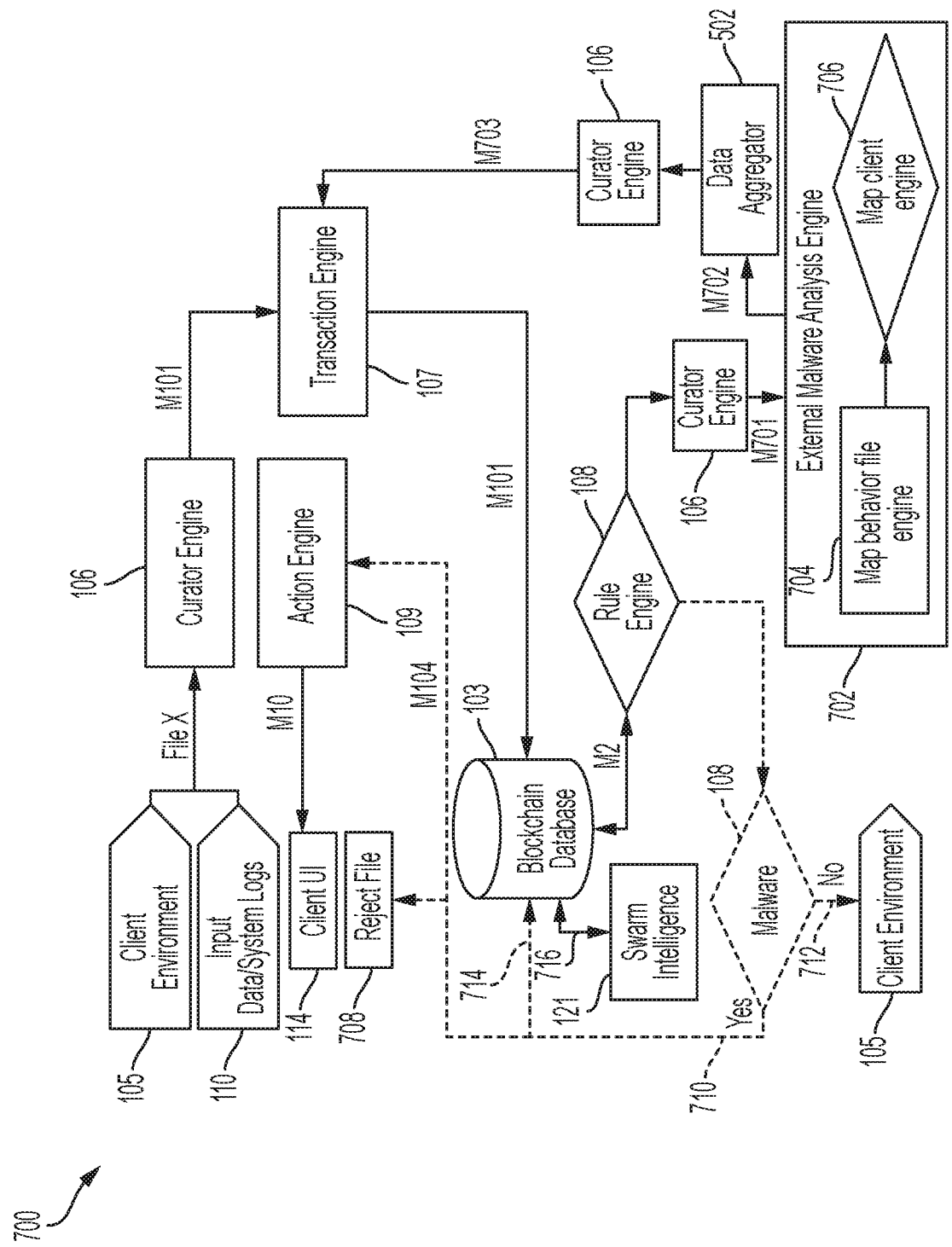
FIG. 7 schematically depicts a component diagram of a malware analysis platform according to one or more embodiments shown and described herein.

With reference now to FIG. 7, a component diagram of a malware analysis platform 700 will now be described. The client environment 105 communicatively coupled to the curator engine 106 of the application layer 101. The curator engine 106 is communicatively coupled to the transaction engine. As such, the curator engine 106 may be configured to process and transform the input data 110 to a structure readable by other components, such as the transaction engine 107. For example, the curator engine 106 may be configured to transform the input data 110 from a data file X into a valid message payload having a header. The curator engine 106 is communicatively coupled to the transaction engine 107. The blockchain database 103 is communicatively coupled to the swarm intelligence 121 and to the rule engine 108. As such, every transaction is logged in the network layer 104 (FIG. 2) and recorded in the blockchain database 103 as transactions with a generated unique transaction identifier M103. It should be appreciated that the unique transaction identifier M103 may also contain other relevant data. Further, it should be appreciated that the rule engine 108 outputs the decision transaction M2 to the blockchain database 103 so that every decision and transaction is recorded within the blockchain database 103, as described in greater detail herein.

In this embodiment, the rule engine 108 is communicatively coupled to curator engine 106 and to the action engine 109. The action engine 109 is communicatively coupled to the client UI 114 such that, if a malware is detected 708, as described herein, the rule engine 108 may transmit the decision signals M104 to the action engine 109, which in turn may transmit the plurality of alerts M10 to the client environment 105 and specifically to the client UI 114.

Still referring to FIG. 7, the curator engine 106 is communicatively coupled to an external malware analysis engine 702 such that the valid message payload having a header M101 may be converted into a data file M701, such as a hash file, so that the external malware analysis engine 702 may interpret the data file M701. The external malware analysis engine 702 is communicatively coupled to the data aggregator 502, which in turn is communicatively coupled to the curator engine 106.

Still referring to FIG. 7, the external malware analysis engine 702 comprises a map behavior file engine 704 and a map client engine 706. The map behavior file engine 704 and the map client engine 706 of the external malware analysis engine 702 are configured to detect unknown vulnerabilities using dynamic behavior analysis. It should be appreciated that the map behavior file engine 704 may be a map file hash of the file and the map client engine 706 may be a map client hash of the file. The unknown vulnerabilities include, but are not limited to zero day threats, ransomware, and/or the like related to the behavioral analysis of the malware. The external malware analysis engine 702 outputs an analysis M702, which is aggregated by the data aggregator 502 and then curated, by the curator engine 106, into a file format M703, which is in a structure readable by other components, such as the transaction engine 107. The file format M703 now continues through the same loop of creating another transaction in the blockchain database 103. As such, the rule engine 108 evaluate the behavior from the new transaction and use the analysis from the map behavior file engine 704 to validate the transaction against past behavior models so to decide whether new transaction is malware. If the rule engine 108 determines that the new transaction is malware, as illustrated by the dotted line 710 in FIG. 7, the data file is rejected 708 and the action engine 109 may alert the client UI 114 as described above. On the other hand, if the rule engine 108 determines that there is not malware in the new transaction, then the data file is allowed to continue to the client environment 105 as indicated by the dotted line 712. It should be appreciated that all behavior analysis is recorded in the blockchain database 103, indicated by dotted line 714, such that the swarm 112 and the swarm intelligence 121 will have immediate access to the determination of whether malware is or is not present as shown by the connection line 716.

In some embodiments, the rule engine 108 behavioral models may include, but are not limited to patterns in Windows operating system such as audit logs, event tracing, kernel drivers and/or the like, which are not directly related to a malware sample. Each of these logs may be mapped to a smart contract and the behavior of these patterns may be analyzed by combining the smart contract with machine learning so to, for example, detect ransomware. In other embodiments, behavior models may include, but are not limited to anomalies in human user behavior data, which is not related to the devices that are inferred using statistical analysis leading, such as, without limitation potential insider threats, theft of internal data, and/or the like. In yet other embodiments, the malware analysis platform 700 may be used to detect zero day vulnerabilities, which may be some of the largest threats that come from vulnerabilities that have not yet been discovered, named, or added to the catalog of known patterns. For example, WannaCry ransomware that recently created havoc exploited the SMBv1 vulnerability that existed unnoticed for 16 years, and flew under the radar of most security products until massive damage was done, may have been detected by the malware analysis platform 700, as discussed herein.

Figure 8:
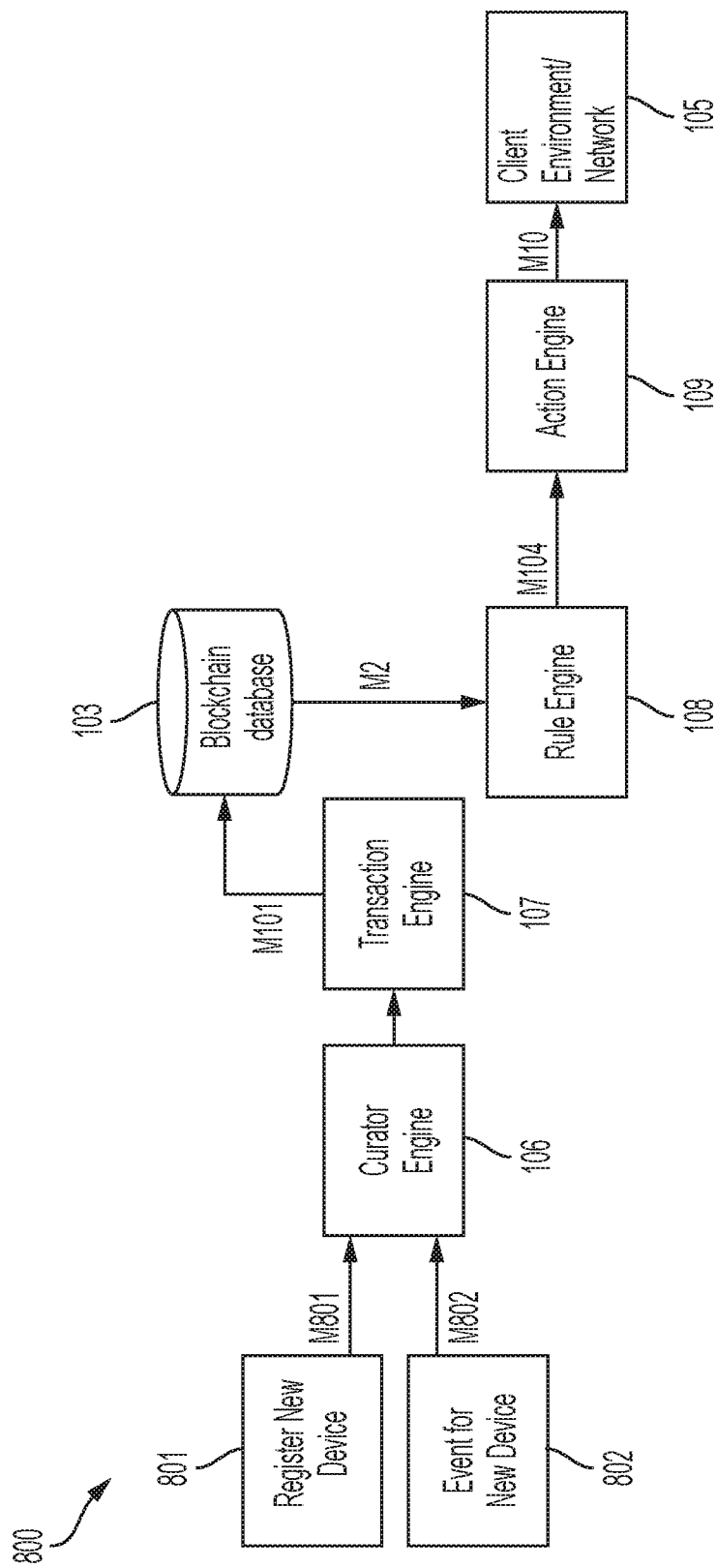
FIG. 8 schematically depicts a component diagram of an internet of things processing platform according to one or more embodiments shown and described herein.

FIG. 8 schematically depicts a component diagram of an internet of things processing platform 800. The processing platform 800 comprises a new device registration 801 and a new device event detection 802, which are both communicatively coupled to the curator engine 106 and then to the transaction engine 107. The new device registration 801 may be configured to register the IoT devices (i.e. the server computing devices 20, the user computing devices 25, the tablet computing devices 35, the mobile devices 40, and/or the like of FIG. 1) to the system 100 with a unique identifier 205 (FIG. 3) as the input data 110 (FIG. 3) such that once registered the data is analyzed using the structure as described above in FIG. 3. The new device event detection 802 may be configured to detect device events such as changes in a plurality of sensors, which may relate to temperature or pressure. This data may be analyzed using the structure as described above in FIG. 3. It should be appreciated that each device (i.e. the server computing devices 20, the user computing devices 25, the tablet computing devices 35, the mobile devices 40, and/or the like of FIG. 1) may have a unique registration number and/or unique event detection capabilities and/or signatures.

Still referring to FIG. 8, the transaction engine 107 may be configured to determine what data can be collected from the IoT devices (i.e. the server computing devices 20, the user computing devices 25, the tablet computing devices 35, the mobile devices 40, and/or the like of FIG. 1). It should be appreciated that every device registration generates a signature M801 and the signature M801 is validated to detect compromised devices. The unique signature M801 is saved to the blockchain database 103 for firmware and code in the IoT device, in which the transaction M2 is sent to the rule engine 108, the rule engine outputs the decision signals M104 to the action engine 109, in which the action engine 109 outputs the plurality of alerts M10 to the client environment 105, as described in greater detail with reference to FIG. 3. It should be appreciated that the unique signature being saved in the blockchain database 103 is then also available to the swarm intelligence 121 to analyze the firmware and the code in the IoT devices. As such, this analysis assists the IoT devices with the enabled capabilities, shielding and enforcing continuous working order.

Figure 9:
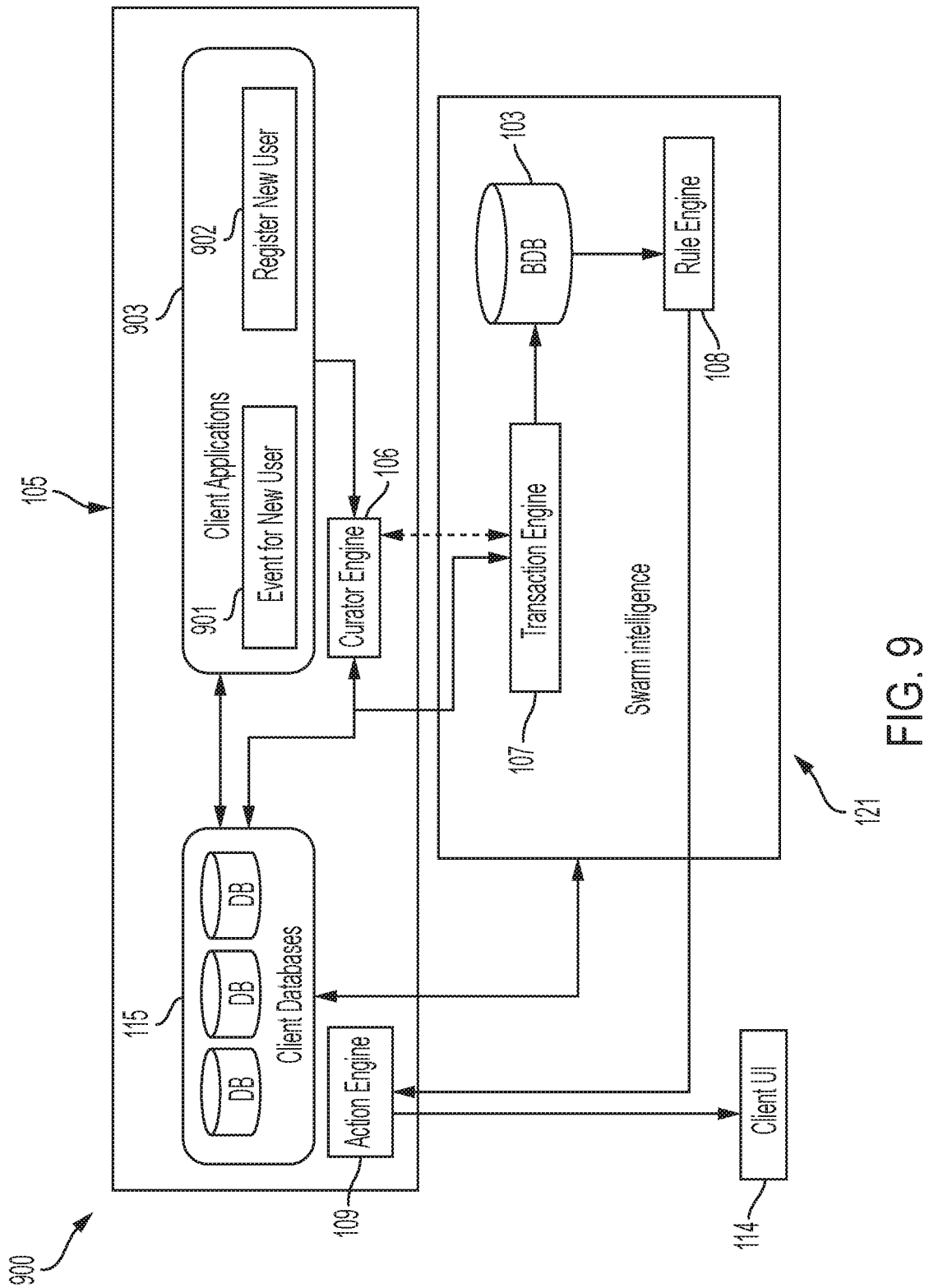
FIG. 9 schematically depicts a component diagram of a privacy policy regulation enforcement according to one or more embodiments shown and described herein.

Now referring to FIG. 9, a component diagram of a privacy policy regulation enforcement system 900 is depicted. The system includes the client UI 114, the client environment 105, and the swarm intelligence 121. The client environment 105 has the plurality of client databases 115, a plurality of client applications 903, the curator engine 106, and the action engine 109. The plurality of client applications 903 includes a new user register 901 and a new user event 902. The plurality of client applications 903 is communicatively coupled to the plurality of client databases 115. The curator engine 106 is communicatively coupled to both the client environment 105 and the plurality of client databases 115. The swarm intelligence 121 includes the transaction engine 107, the blockchain database 103, and the rule engine 108 as described in greater detail herein. The swarm intelligence 121 is communicatively coupled to the client environment 105. The transaction engine 107 is communicatively coupled to the curator engine 106 and to the blockchain database 103. The blockchain database 103 is communicatively coupled to the rule engine 108. The rule engine 108 is communicatively coupled to the action engine 109. The action engine 109 is communicatively coupled to the client UI 114. The system 900 is configured to execute and enforce a plurality of data traceability from an integrated system across a browser, a session, a webserver, or the plurality of first databases configured with a personal identifiable information by indexing the personal identifiable information from a genesis block such that a user is permitted to log, delete or encrypt the personal identifiable information according with current and future policy laws.

As such, third party application that is capable of interacting with the curator engines 106, the action engine 109 and/or the like so to log and trace any data within a computer system can be used. By leveraging this degree of control and logging, is possible to give absolute ownership of the user data back to the user itself, by showing and logging every interaction within the system 900 that is hosting the application or web page being used. Any kind of information being stored into the host database, for example the blockchain database 103, web server, client environment 105 and/or the like can be traced and logged within a permissioned blockchain database.

Still referring to FIG. 9, it should be appreciated that privacy policy regulation may be a General Data Protection Regulation (GDPR) enforcement. That is, by executing and enforcing data traceability across browsers, sessions, web servers, databases with Personal Identifiable Information (PII), logs and any other system capable of being integrated may be included in the system 900. By indexing PII from its genesis, it is possible to referencing their location, storage media, and size, ensuring all locations and media to be accessible to the user, allowing deletion and encryption checks according with current and future policy laws.

Figure 10:
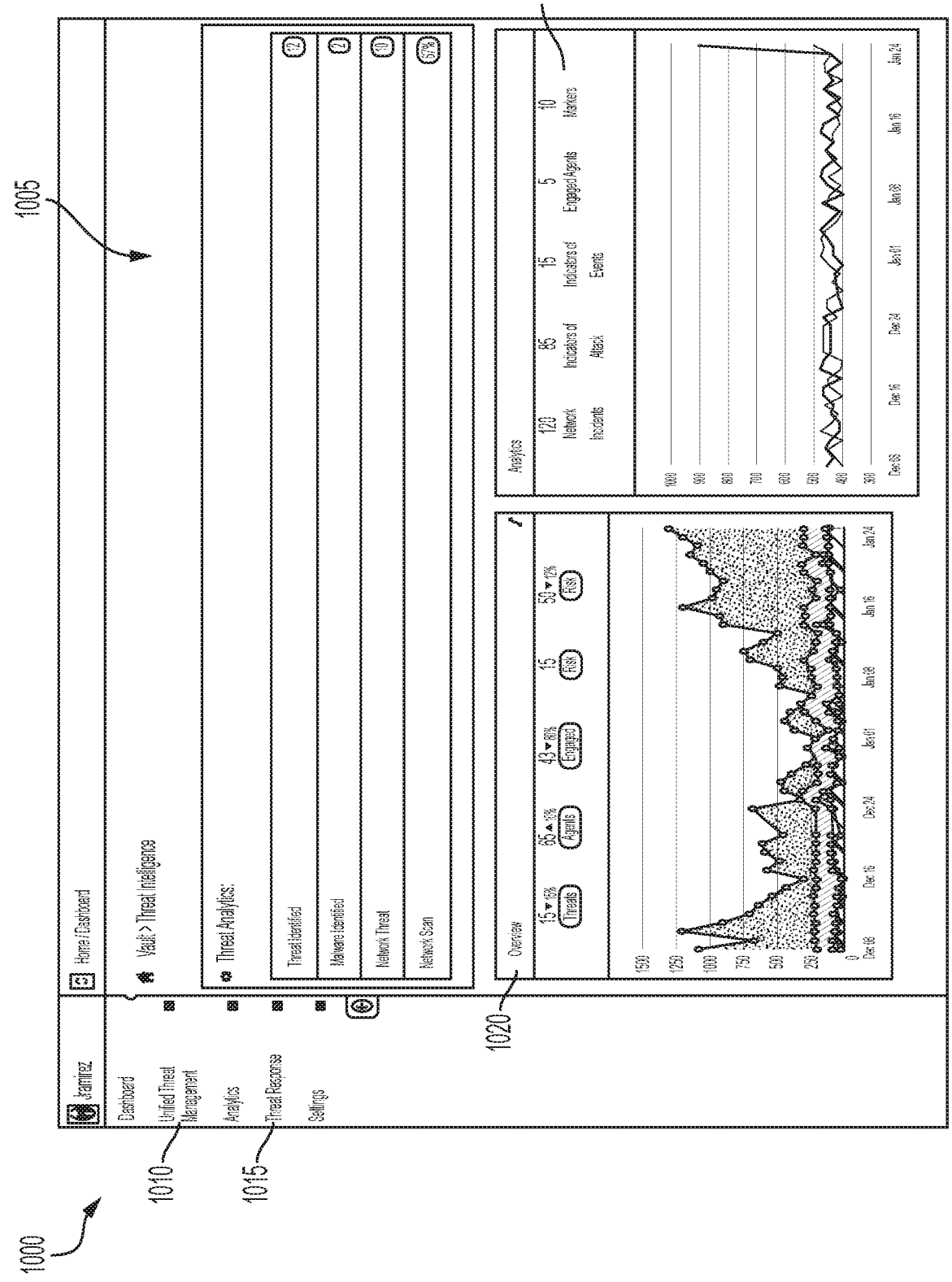
FIG. 10 schematically depicts a user interface according to one or more embodiments shown and described herein.

Now referring to FIG. 10, a schematic illustration of the user interface 1000 is depicted. As discussed herein, any and all vulnerabilities, security threats, and/or the like are monitored from the user interface 1000. As such, the user interface 1000 may be a potential and a visual construct of the underlying data structures such that the user interface 1000 may be a visual construct that makes possible the visual representation of malware threat analytics within the client environment 105, showing the potential threat index over time, and overview of summarizing risks and agents of the client being engaged at any given time. The user interface 1000 may display a plurality significant events occurring within the swarm 112 and provides the client the complete graphical view of the events, categories, event types, distribution, and/or the like. Therefore, the overall threats identified, malware identified, threats that are coming from a network or network scans identified are displayed.

As such, the user interface 1000 may display a threat analytics graphical representation 1005, permit a unified threat management 1010, and permit a threat response 1015. The threat analytics graphical representation 1005 may graphical represent different threat metrics identified for a time period for malware, network scans, incidents, IOA, IOE, corresponding Agents, and/or the like. The unified threat management 1010 may permit a CSO/user to configure data sources for log files, to set up deceptive honeypots, crawlers, and/or the like as preventive measures. The threat response 1015 may permit a CSO/user to configure alerts, roles, response mechanisms for threats detected. And/or the like. It should be appreciated that the user interface 1000 is not limited to this data structures and/or the visual constructs herein.

The origins and path of a threat can be traced from the user interface 1000. A swarm 112 under attack may be seen from the user interface 1000. The user interface 1000 may display a bird's eye view of the swarm 112 and events within the swarm 112. The group of nodes 111 within the swarm 112 may be displayed. A user may be able to drill down for any selected or particular node within the group of nodes 111. The events are viable payloads that can be transferred between each node of the group of nodes 111. The transfer of events information as payloads between each node of the group of nodes 111 within the blockchain database 103 may also be seen from the user interface 1000. Further, the user interface 1000 may also provide clients with customization capabilities for the alerts, triggers, incident response and notifications, and/or the like. An overview of the threats 1020 is provided on the user interface 1000. As such, the user interface 1000 offers threat management, different kinds of threat analytics 1025 and the ability to configure threat response amongst others. Data sources can be configured using the user interface 1000. Honeypots and crawlers may be configured for deception and to deflect threats and intruders.

Figure 11:
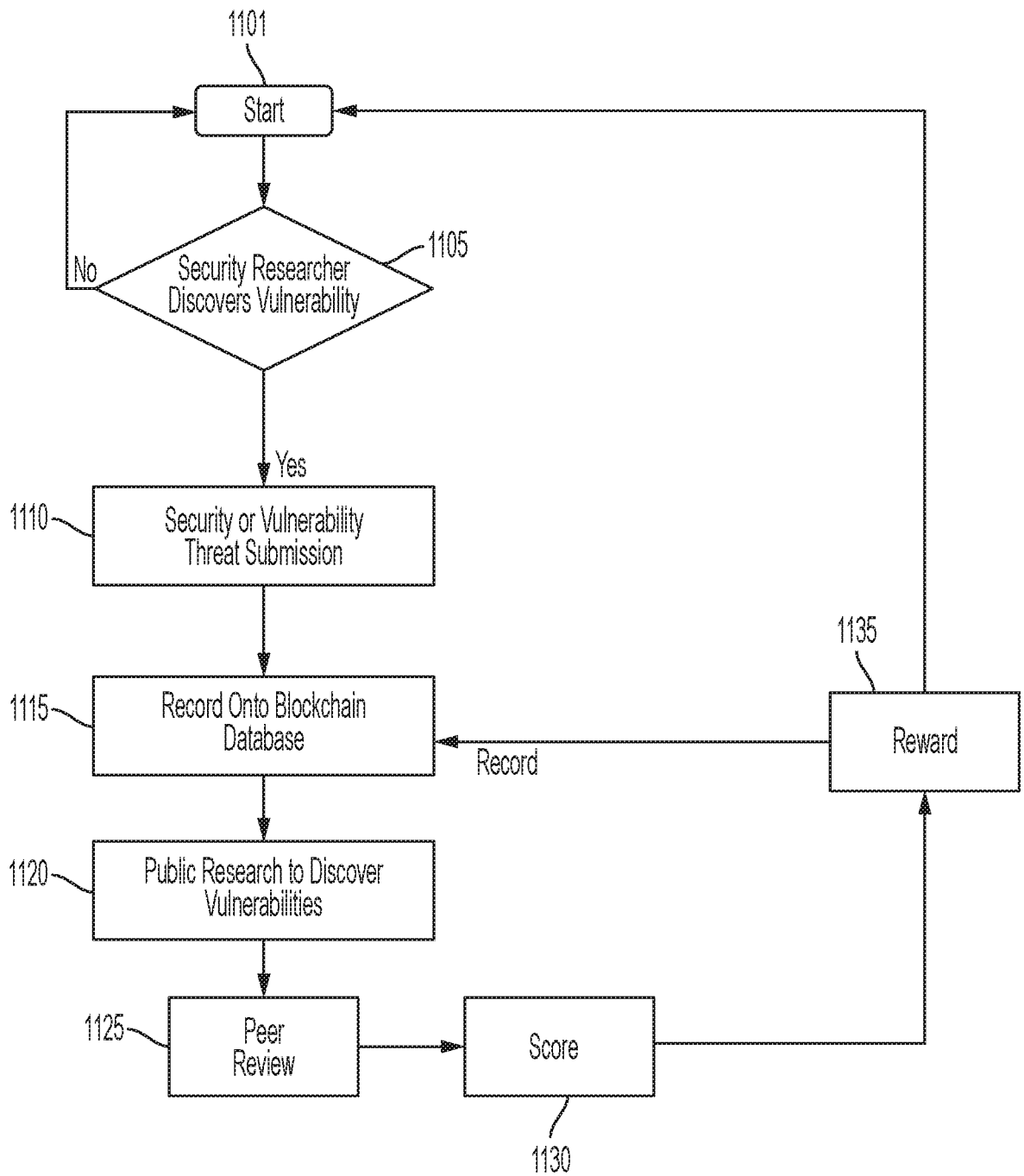
FIG. 11 depicts a flow diagram of an illustrative method of researching and reporting cyber threats according to one or more embodiments shown and described herein.

Now referring to FIG. 11 where a flow diagram depicting an illustrative method of researching and reporting cyber threats 1100 will now be described. It should be appreciated that that the method of researching and reporting cyber threats 1100 starts with a researcher, at block 1101, searching for a plurality of security or vulnerability threats, at block 1105. If a researcher does not find the plurality of security or vulnerability threats, at block 1105, the researcher continues searching at block 1101. If the researcher discovers at least one of the plurality of security or vulnerability threats, at block 1105, the researcher may anonymously upload and/or submit the plurality of security or vulnerability threats, at block 1110, where the submission is recorded in the blockchain database 103, at block 1115. Once recorded, the at least one of the plurality of security or vulnerability threats is transmitted to the network 15 (FIG. 2) so that there may be public research to discover the security or vulnerabilities threats, at block 1120, such that the at least one of the plurality of security or vulnerability threats is available for a peer review, at block 1125.

A score is assigned to the at least one of the plurality of security or vulnerability threats based on the peer reviews, at block 1130, and a reward is generated based on the score, at block 1135, such that the researcher receives the reward, at block 1101, and both the scores and the rewards are recorded in the blockchain database 103 at block 1115. It should be appreciated that rewards may be used in an ICO. Further, the rewards may be issued within the system by a proof of work mechanism such as, without limitation, cryptocurrencies including Bitcoin, Ethereum, and/or the like. Moreover, it should be appreciated that the peer review may be a plurality of external individuals, a plurality of researchers, a plurality of machines having supervised and/or unsupervised machine learning and configured to provide legitimate intelligence, computational validation and/or the like. As such, the plurality of external individuals, the plurality of researchers, the plurality of machines and/or the like may be rewarded through a valid and fair mechanism such as, without limitation, cryptocurrencies including Bitcoin, Ethereum, and/or the like.

Figure 12:
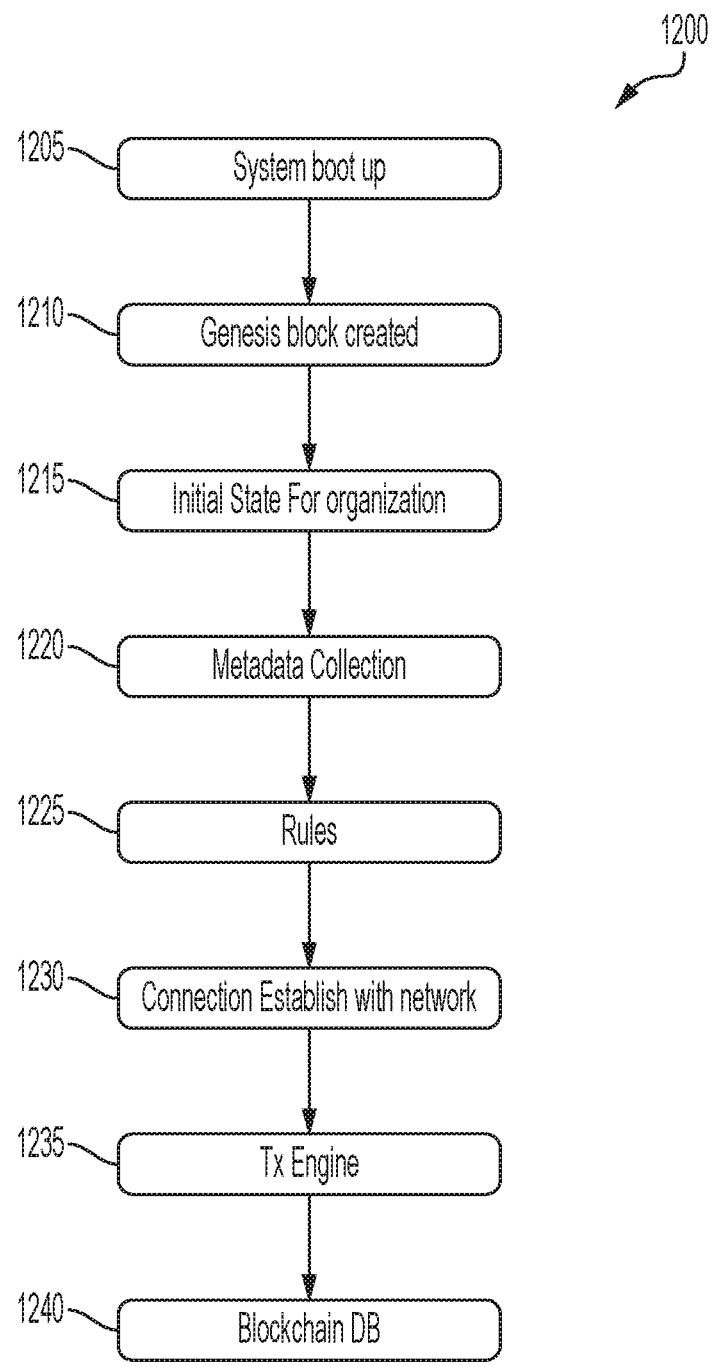
FIG. 12 depicts a flow diagram of an illustrative method of a system start-up according to one or more embodiments shown and described herein.

Now referring to FIG. 12 where a flow diagram depicting an illustrative method of a system start-up process 1200 is depicted. The system 1200 is booted, at block 1205. When the system is booted, a genesis block is created, at block 1210. The genesis block may be configured to generate the IDs and hashes for all other connected nodes of the group of nodes 111, the transaction engines 107, the curator engines 106, the rule engines 108, the blockchain databases 103, and/or the like such that when data enters the nodes 111, a smart contract engine (not shown) may generate the smart contract 305 having the header which consists of timestamp, data, hash, previous hash and respective ID. The header, along with the valid message payload having a header M101 may be transferred to the group of nodes 111 at lightning speed. As such, from the onset, or an initial state, datasets from data vectors and data structures are pushed to the blockchain based system 100, at block 1215. Metadata (digital representations of the assets) for all structures such as firewalls, servers, database system, and/or the like is created, at block 1220. At block 1225, a plurality of rules are established and, at block 1230, a connection with the network layer 104 is established such that there is communication between the swarm 112 and/or the swarm intelligence 121. Therefore, the plurality of rules are constantly being validated and created, illustrated at line 1227. The transaction engine 107 collects the metadata from the network layer 104, at block 1235, and sends the collected metadata from the network layer 104 to the metadata at block 1220 illustrated by line 1237, and writes to the blockchain database 103, at block 1240. It should be appreciated that this process 1200 is continuous and the system is not waiting for analysis from a centralized source for generating any alert as every node is equally matured to detect and respond to attacks.

Figure 13:
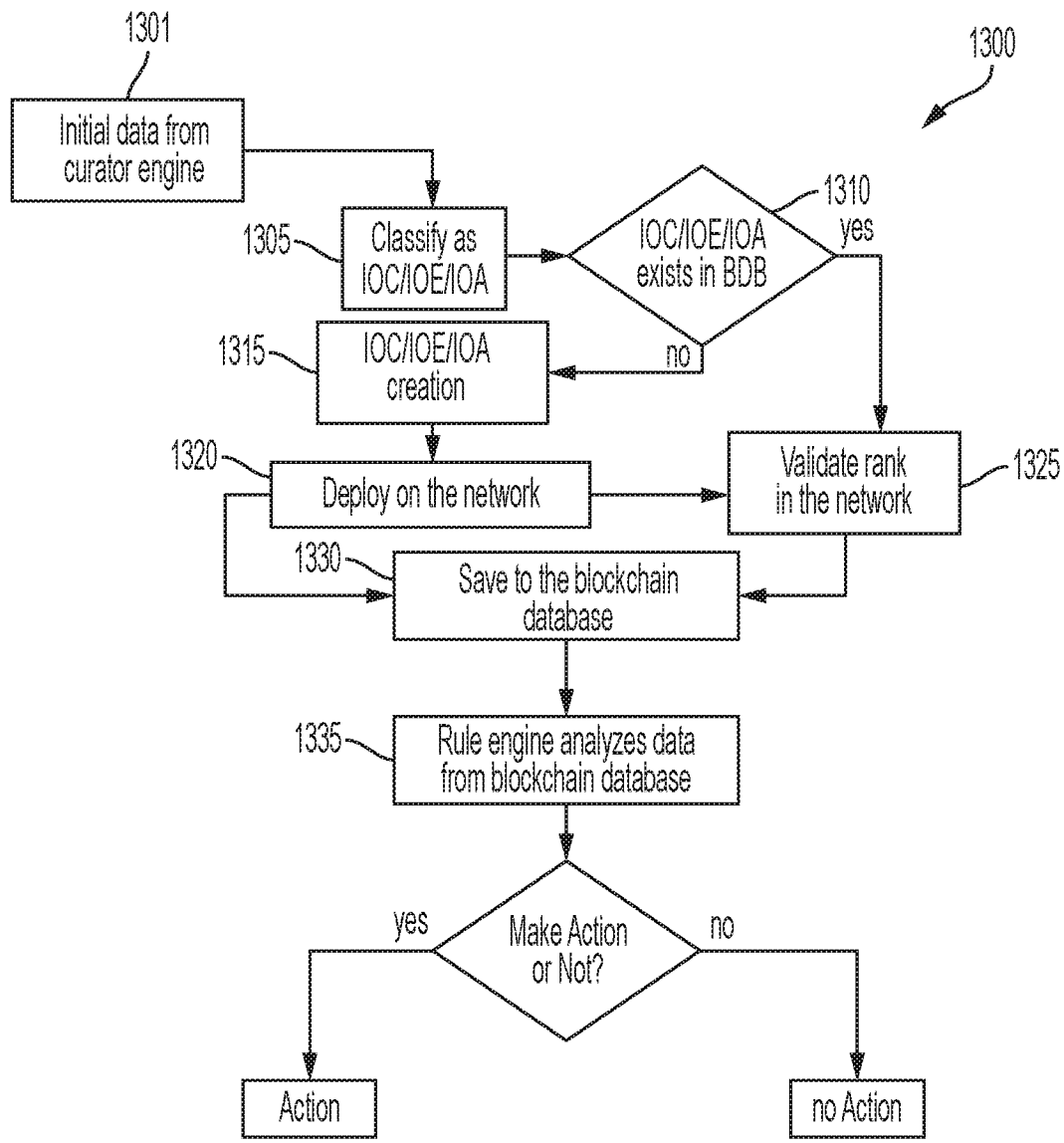
FIG. 13 depicts a flow diagram of an illustrative method of data flow and processing data to determine whether an incident of comprise has occurred according to one or more embodiments shown and described herein.

FIG. 13 depicts an example flow diagram of an illustrative method 1300 of data flow and processing data to determine whether an incident of comprise has occurred. The curator engine 106 begins at block 1301 to transfer the valid message payload having a header M101 into the system 200 (FIG. 3) such that any IOC's, IOE's, IOA's, and/or the like may be classified at block 1305. The classified IOC's, IOE's, IOA's are then determined as to whether the IOC's, IOE's, IOA's exists in the blockchain database 103, at block 1310. If the IOC's, IOE's, IOA's do not exist in the blockchain database 103 at block 1310, then the IOC's, IOE's, IOA's are created at block 1315, deployed on the network layer 104 at block 1320 so to have a validate rank in the network at block 1325 as well as concurrently saving the IOC's, IOE's, IOA's in the blockchain database 103 at block 1330. On the other hand, if the IOC's, IOE's, IOA's exist in the blockchain database 103 then the IOC's, IOE's, IOA's may be validate rank in the network at block 1325. It should be appreciated that the validation, ranking, and/or the like in the network may be by a plurality of researchers, a plurality of individuals, an automated analysis such as unsupervised or supervised machine learning, a network consensus from the client environment, and/or the like.

With the validation, rank, and/or the like of the IOC's, IOE's, IOA's completed, the validation, rank, and/or the like are saved to the blockchain database 103 at block 1330. The rule engine 108 analyzes the saved IOC's, IOE's, and IOA's, the validation, the rank, and/or the like from the blockchain database 103 at block 1335 so to determine what action, if any is needed by the action engine 109 at block 1340.

It should be appreciated that the smart contract engine (not shown) may be configured to processes the smart contracts 305, generally known as a piece of dynamic lines of code. Smart contracts are a computer protocol intended to digitally facilitate, verify, or enforce the negotiation or performance of a contract. Smart contracts allow the performance of credible transactions without third parties. These transactions are trackable and irreversible and live within the network layer 104 (FIG. 2) and within each node, such as without limitation, the client reporter node 111a, the second node 111b, and the nodes 111c, 111d, 111e, 111f with a unique address. Every subsequent version of the contract is stored and a new hash id is created. With it a contract versioning system is enforced. Smart contracts are deployed within the network, so all behavioral analysis can be validated, evaluated by all peer members. In one embodiment, behavioral information include but not limited to patterns in Windows operating system such as audit logs, event tracing, filesystem changes, kernel drivers modification, memory corruption, buffer overflow, and/or the like that are not directly related to a malware sample. Each of these logs can be mapped to a smart contract and the behavior of these can be analyzed by combining the smart contract with machine learning for example to detect ransomware. In another embodiment Behavior analysis include but not limited to human behavior that falls outside the pattern and creates anomalies that indicate illegitimate actions In some embodiments, a computer program capable of detecting vulnerabilities and anomalies in a computational environment is disclosed by using a distributed approach to intelligence and machine learning implementations. As such, a block chain environment as a distributed knowledge database may be used. Vulnerabilities and anomalies existing in a cybersecurity landscape may be detected. The input to such systems includes threat data, such as security information and event management (SIEM), firewalls and unified threat management systems, intrusion detection and prevention, secure web gateways, secure email gateways, endpoint protection, web application protection, distributed denial of service, vulnerability management, security orchestration, and/or the like. The vulnerabilities and anomalies in any cybersecurity landscape include, but are not limited to zero day, malware, ransomware, persistent threats, and/or the like. It should be understood that machine learning implementation includes both supervised and unsupervised learning. Further, swarm implementation includes, but is not limited to, particle swarm optimization techniques. Further yet, this method may generate a unique digital representation of the target computer environment and categorize server metadata, including but not limited to ports, current system configuration, operating system, current user usage and permissions, access levels, network configuration and connectivity, services and active services. By auditing specific portions of the databases and services, executing predefined queries and storing the results in an immutable blockchain database and distributed among trusted agents, key changes may be identified by administrators and users alike to the configuration that could affect usability, overall system integrity and or comprised of information. As such, detected vulnerabilities and anomalies reported include, but are not limited to alerts and notifications on a user accessible interface (UI) for further action.

Another embodiment envisioned is a method to analyze, detect vulnerabilities and anomalies on Internet of Things (IoT) enabled devices, computer environments and related components by generating a unique digital representation of the target device and or environment and categorize server metadata, including but not limited to ports, current system configuration, operating system, current user usage and permissions, access levels, network configuration and connectivity, services and active services, interconnected components. By auditing specific portions of the datasets and services, executing predefined queries and storing the results in an immutable blockchain database and distributed among trusted agents. As such, key changes may be identified by administrators and users alike and such that identification of a configuration that may affect usability, overall system integrity and or comprised of information. Related components include, but are not limited to, memory storage devices and endpoint sensor components. This method may include the capabilities for analyzing and validating data between the agents, allowing data particle swarm optimization analysis methodology and/or the like to take place. By leveraging such data and filtering it with supervised and unsupervised machine learning techniques the system can learn and detect anomalies, malfunctioning devices, and insecure components. Such anomalies include cyber security threats, incidents that can affect usability, overall system integrity, and or comprised information. Such computer environment includes but not limited to, firmware of devices, drivers of sensors and peripheral components to the IoT devices and human machine interface. Such detected vulnerabilities and anomalies reported include, but not limited to alerts, notifications on a user accessible interface (UI) for further action.

Another embodiment contemplated is a method to generate auditable, compliant and immutable data of a computer environment by using a distributed approach to intelligence and machine learning implementations. Such a method includes using a block chain environment as a distributed knowledge database. The input to such a system includes threat data, such as security information and event management (SIEM), firewalls and unified threat management systems, intrusion detection and prevention, secure web gateways, secure email gateways, endpoint protection, web application protection, distributed denial of service, vulnerability management, security orchestration, and/or the like. Such detected vulnerabilities and anomalies reported include, but are not limited to alerts and notifications on a user accessible interface (UI) for further action. Such auditable information includes but now excludes personal identifiable information according to GDPR regulatory domain.

Another embodiment contemplated is a method to analyze, detect vulnerabilities and security anomalies in data storage by generating a unique digital representation of the target device and/or environment and categorize the file metadata. Such a method includes using a blockchain environment as a distributed knowledge database and using a distributed approach to intelligence and machine learning implementations. Such a data environment includes, but is not limited to, cloud environments, such as Microsoft Office 365, Dropbox, Google Drive, Sharepoint, and/or the like. Such detected vulnerabilities and anomalies reported include, but are not limited to alerts and notifications on a user accessible interface (UI) for further action.

Another embodiment contemplated is a method to analyze, detect vulnerabilities and security patch advisories by generating a unique digital representation of the target device and or environment and categorize the file metadata. Such a method includes using a blockchain environment as a distributed knowledge database as a distributed approach to intelligence and machine learning implementations to identify key components to patch according to the scenarios an attack surface of the objects. Such detected vulnerabilities and anomalies reported include, but are not limited to alerts and notifications on a user accessible interface (UI) for further action.

Another embodiment contemplated is a method that allows the security community to share, test, deploy unknown vulnerabilities and anomalies using a peer review platform. Such a peer review platform include, but are not limited to, a blockchain network, peer to peer network, social networks, and/or the like. Such unknown vulnerabilities and anomalies include but not limited to zero day, ransomware, malware, critical failure, network attack, misconfiguration, and/or the like.

Another embodiment contemplated is a method that allows to share, analyze and enforced privacy policy regulations such as GDPR, optional managed for and by company end user. Such information is shared within a client side node that is installed, reviewed, and audit by user in browser directly connected, encrypted and shared with a blockchain created within the swarm for such use. Such information being generated, logged, and added to the blockchain can be reviewed, erased or downloaded by any permission granted user according to ownership data regulatory domain. Further, the method may allow the company end user to handle, observe, analyze, and share their own personal identifiable information.

In some embodiments, a nonlimiting example of a system 100 operation for malware and its behavior is classified and stored on a block-chain type system, generating transactions and derivative behavior caused by the target systems. The matching hash or the malware is then distributed among the peers devices and analytical engines to further detect and/or explore the malware behavior. If any device detects similar malware metadata information, such node can alert, shutdown or notify the target or connected system that originated such alarm. In another embodiment related to intrusion detection systems to detect if a given node has an anomaly through an outside intruder being stationed illegally in a client environment, swarm intelligence 121 connected to the rule engine 108 will employ techniques like PSO successfully for effective intrusion detection systems. PSO helps to find the optimal solution for detecting intrusions in terms of Artificial Neural Networks (ANNs) by finding the optimized values of weights of ANNs. The optimized ANN solution identifies intrusive and non-intrusive activities in the computer network. In a nutshell, Swarm Intelligence based techniques like PSO is most promising techniques for developing an effective solution in the field of Intrusion Detection and Fraud Detection combined with ANN using Artificial Intelligence techniques.

It should be appreciated that this disclosure has a unique strength to support various applications that include, but are not limited to IoT, Malware and/or the like in a single integrated environment, which drastically enhances the speed of detecting threats, eliminates the redundant effort of searching similar threats in different applications independently and reduces false positives as the system has the integrated view of all security solutions.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of detecting vulnerabilities and anomalies in a distributed computational environment, the method comprising the steps of:
    receiving, from a client environment, at least one input data distributed among a plurality of nodes within a particular network;
    receiving, from at least one of the plurality of nodes, the at least one input data into a curator engine, receiving, from the curator engine, the at least one input data into a transaction engine;
    evaluating the at least one input data for information and events or vectors of attack;
    validating the information and events or vectors of attack;
    ranking the information and events or vectors of attack as an indicator;
    logging the indicator into the node of the particular network;
    recording the indicator into a blockchain database as a transaction having a unique transaction identifier;
    reading, by a rule engine, the transaction from the blockchain database;
    processing, by the rule engine, the transaction so to make a decision to transform or analyze the transaction based on a predetermined set of rules;
    receiving, by an action engine, transaction from the rule engine; and
    processing, by the action engine, the transaction received from the rule engine, wherein the action engine decides a predetermined action and generates feedback to the client environment based on the predetermined action.

2. The method of claim 1, wherein the validating, the evaluating, the ranking, the recording, and the logging are performed by a plurality of researchers, an automated analysis or a network consensus from the client environment.

3. The method of claim 2, wherein the plurality of researchers, a plurality of external individuals or a plurality of machines that provide legitimate intelligence are rewarded.

4. The method of claim 1, wherein the rule engine input is swarm intelligence using a plurality of data inputs.

5. The method of claim 4, wherein to detect an anomaly through an outside intruder stationed illegally in the client environment, the swarm intelligence is configured to utilize particle swarm optimization techniques.

6. The method of claim 5, wherein the swarm intelligence comprises a plurality of nodes, each node having at least one blockchain database and at least one smart contract.

7. The method of claim 6, wherein the plurality of nodes are in communication with each other so to securely share information.

8. The method of claim 7, wherein the plurality of nodes act as at least a processor, a storage, a router, or a relay whether or not in communication with the client environment.

9. The method of claim 1, further comprising: validating, within a swarm intelligence, the at least one input data from the client environment;
    generating, by the transaction engine, a second unique identifier;
    recording the second unique identifier into the blockchain database as a new transaction;
    analyzing, by the rule engine, the second unique identifier from the blockchain database; and
    processing, by the action engine, the recorded second unique identifier from the rule engine, wherein the rule engine decides on direction and flow of an analysis such that a notification or alert is triggered to other nodes and other agents outside of the client environment.

10. The method of claim 9, further comprising: creating, by a client agent, at least one new rule; validating, by the rule engine, the at least one new rule; and recording the at least one new rule in the blockchain database, wherein each new rule must adhere to the predetermined set of rules.

11. The method of claim 10, wherein the swarm intelligence comprises a plurality of nodes, each node having at least one blockchain database and at least one smart contract.

12. The method of claim 11, wherein the plurality of nodes are in communication with each other so to securely share information.

13. The method of claim 12, further comprising: organizing and integrating, by the curator engine, the at least one input data so to be transferred to a swarm application program interface;

performing, by the swarm intelligence, machine learning on the at least the one input data;

communicating, by the swarm application program interface the machine learned at least one input data; and recording the machine learned at least one input data in the blockchain database.

14. The method of claim 13, further comprising: transferring, from a web, the at least one input data into a data aggregator; transferring, by the data aggregator, to the curator engine, processing, by the curator engine, the at least one input data so to transfer the data to the swarm intelligence.

15. The method of claim 14, wherein the web is a deep web or a dark web.

16. The method of claim 15, wherein the swarm intelligence is configured to scan the deep web or the dark web to gather information to predict an attack while simultaneously scanning for stolen information or gather intelligence on a plurality of zero day vulnerabilities.

17. The method of claim 16, wherein an open source and a third party source require a connector to transfer data to the data aggregator.

18. The method of claim 13, wherein the machine learning is unsupervised or supervised.

* * * * *